(12) United States Patent
Iida

(10) Patent No.: US 6,819,640 B1
(45) Date of Patent: Nov. 16, 2004

(54) DISC-SHAPED RECORD MEDIUM, METHOD FOR MANUFACTURING THE SAME, AND APPARATUS FOR MANUFACTURING THE SAME

(75) Inventor: Michihiko Iida, Kanagawa (JP)

(73) Assignee: Sony Corporation, Tokyo (JP)

( * ) Notice: Subject to any disclaimer, the term of this patent is extended or adjusted under 35 U.S.C. 154(b) by 149 days.

(21) Appl. No.: 09/708,245

(22) Filed: Nov. 7, 2000

(30) Foreign Application Priority Data

Nov. 9, 1999 (JP) .......................................... P11-318636

(51) Int. Cl.⁷ ................................................. G11B 7/00
(52) U.S. Cl. ................. 369/47.1; 369/275.3; 369/47.27
(58) Field of Search .............................. 369/47.1, 275.3, 369/59.75, 44.13, 47.22, 47.27

(56) References Cited

U.S. PATENT DOCUMENTS

| | | | |
|---|---|---|---|
| 5,604,726 A | | 2/1997 | Karube |
| 5,703,867 A | * | 12/1997 | Miyauchi et al. ........ 369/275.3 |
| 6,097,695 A | * | 8/2000 | Kobayashi ............... 369/275.4 |
| 6,243,338 B1 | * | 6/2001 | Mine ........................ 369/47.1 |

FOREIGN PATENT DOCUMENTS

JP 6-28673 2/1994

* cited by examiner

Primary Examiner—Nabil Hindi
(74) Attorney, Agent, or Firm—Oblon, Spivak, McClelland, Maier & Neustadt, P.C.

(57) ABSTRACT

The objective of the present invention is to prevent crosstalk between adjacent pregrooves, and to enable a manufacturing of a writable optical disc which has high storage density. In the present invention, a disc-shaped record medium in which pre-format addresses are written in its grooves for guiding a light beam is manufactured by conducting a simulation where, in order that the crosstalk caused by the coexistence of an arbitrary pre-format address with the other pre-format address adjacent to the arbitrary pre-format address in the inner and outer peripheral direction at the reading point of the arbitrary pre-format address, specific dummy information for timing adjustment is inserted beforehand between the pre-format address in the target frame and the pre-format address in the other frame next to the target frame. Based on the control signal for groove formation, a light beam with a predetermined intensity is caused to oscillate on the original disc in its inner and outer peripheral direction while the original disc is rotated at a predetermined linear velocity to define the pregrooves and lands on the original disc. As a result, the pre-format addresses are written in the grooves for guiding a light beam.

13 Claims, 18 Drawing Sheets

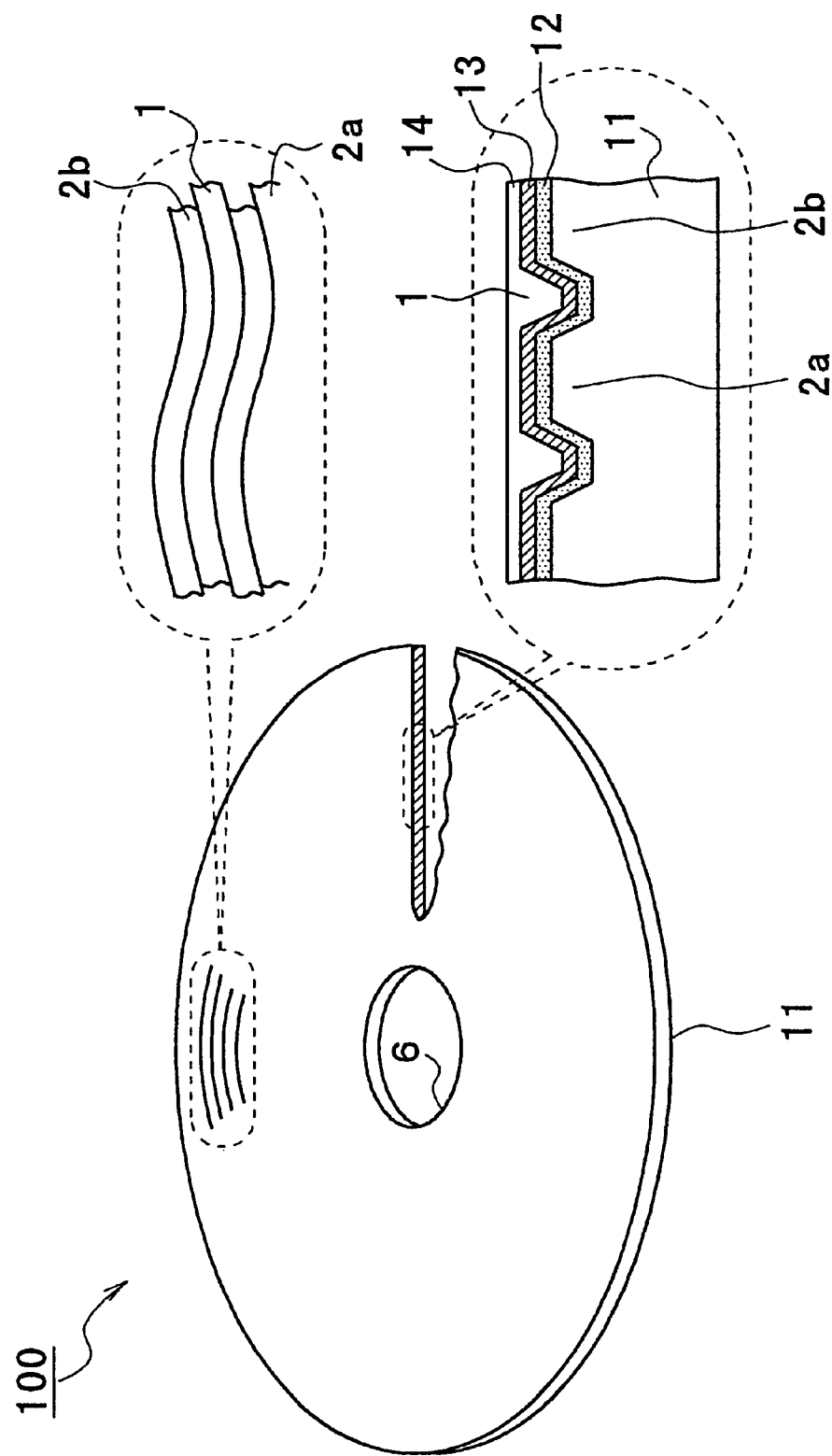

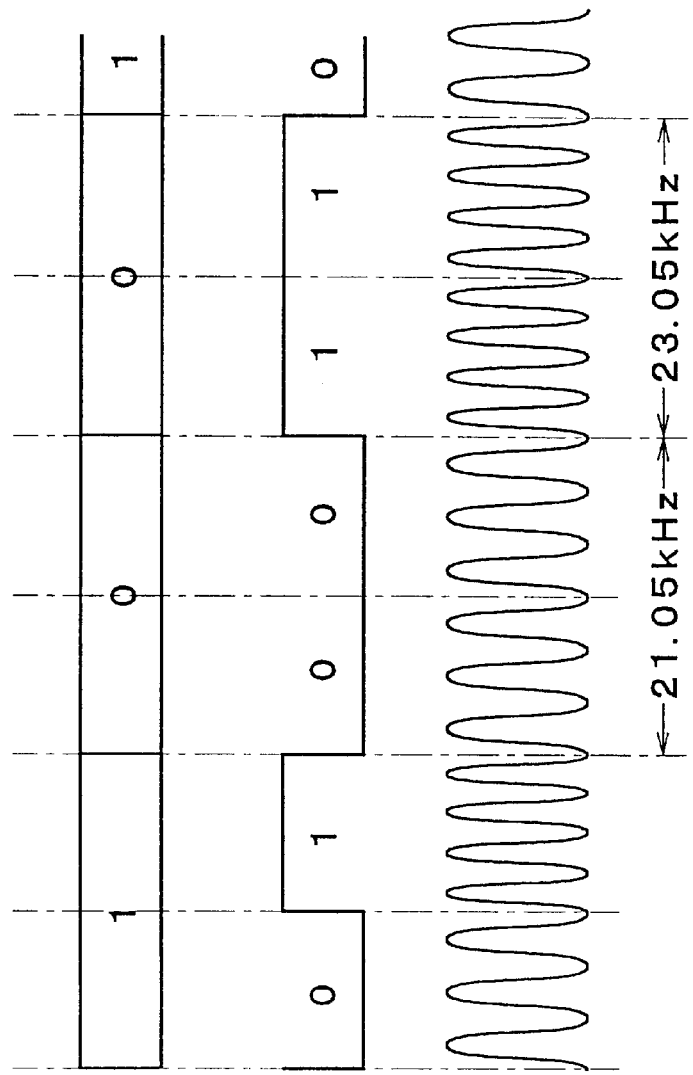
FIG. 4A ATIP INFORMATION
FIG. 4B BI-PHASE SIGNAL DBP
FIG. 4C WOBBLE SIGNAL SWB

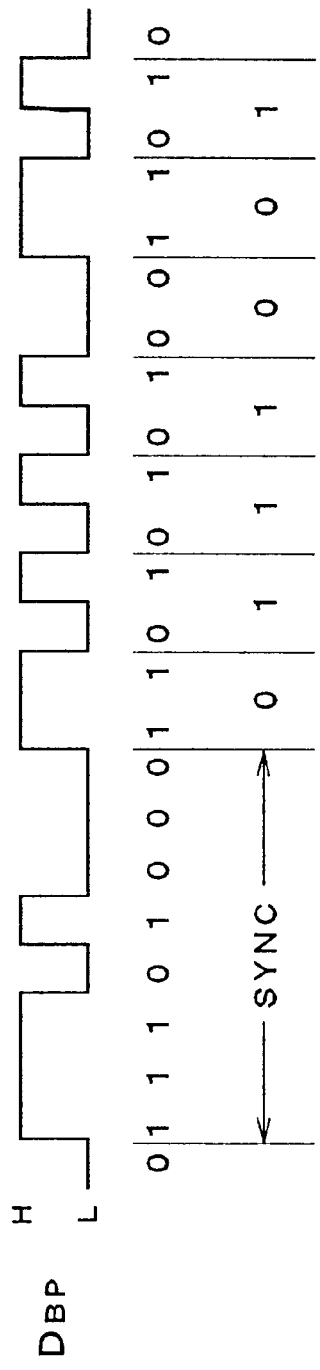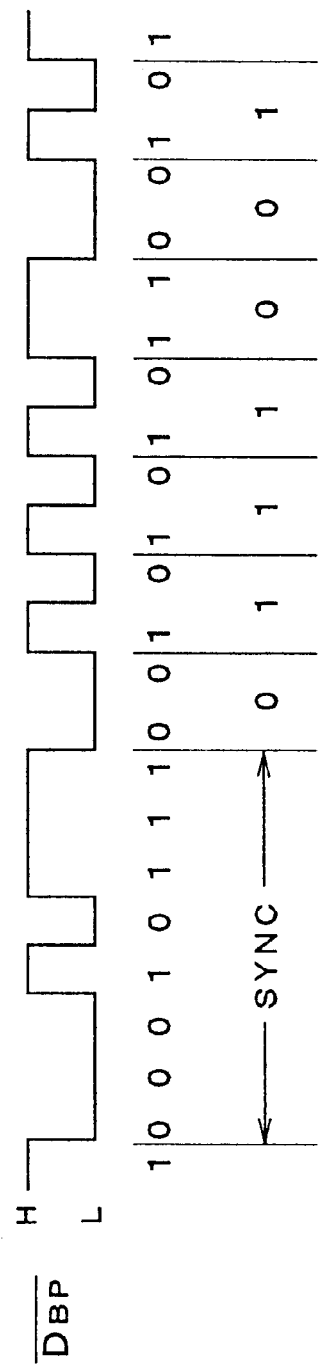
FIG. 7A
FIG. 7B

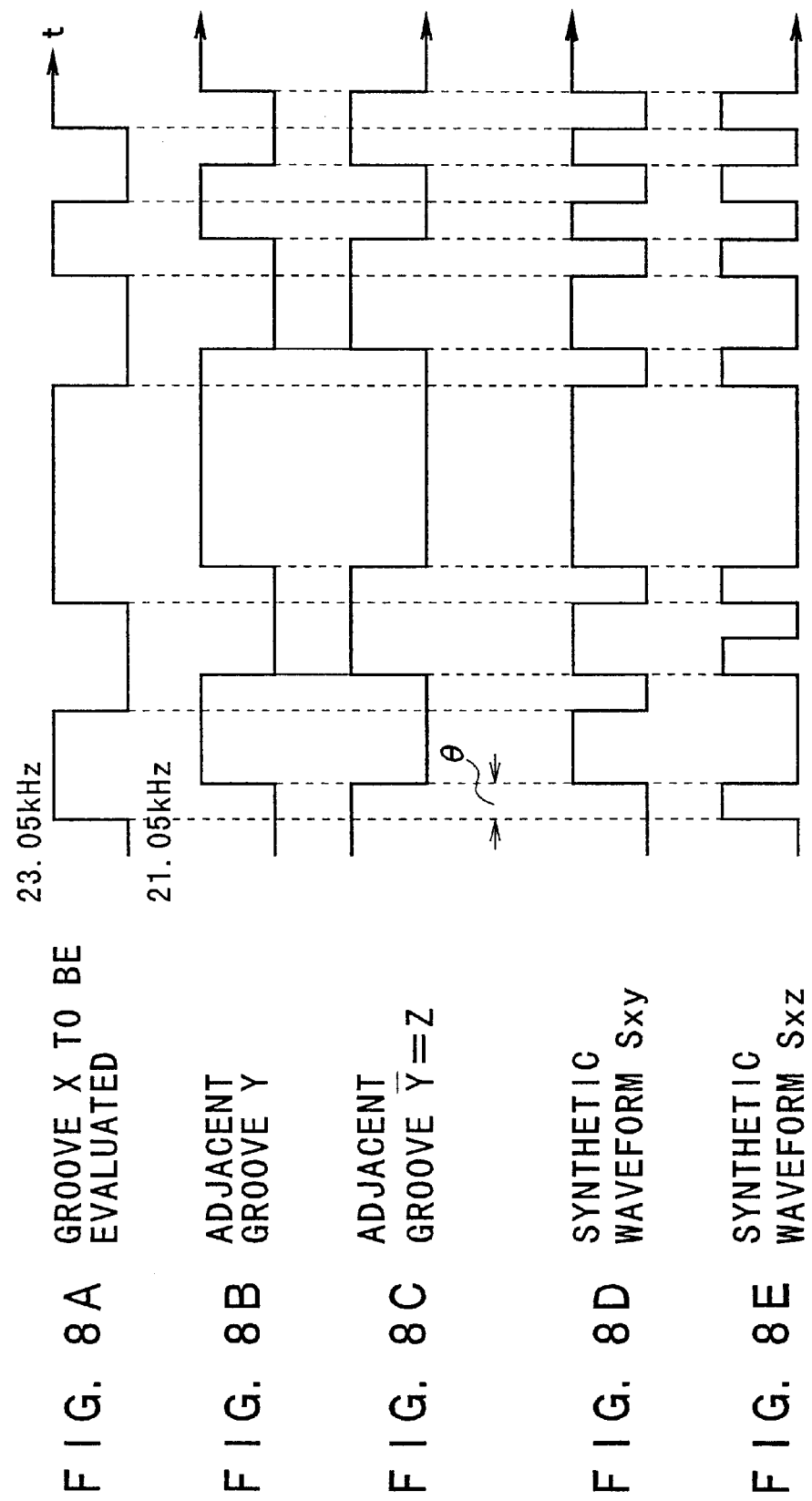

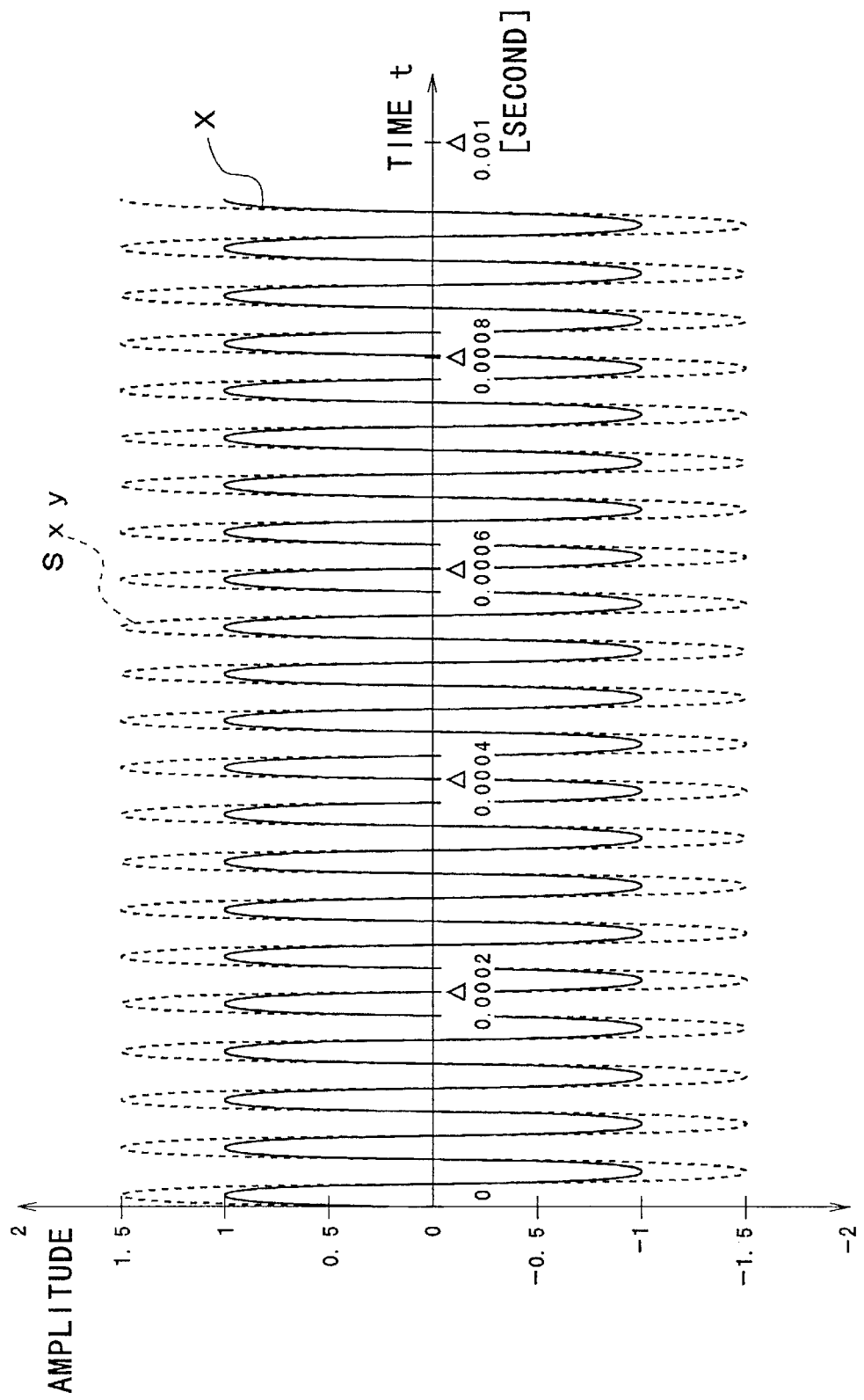

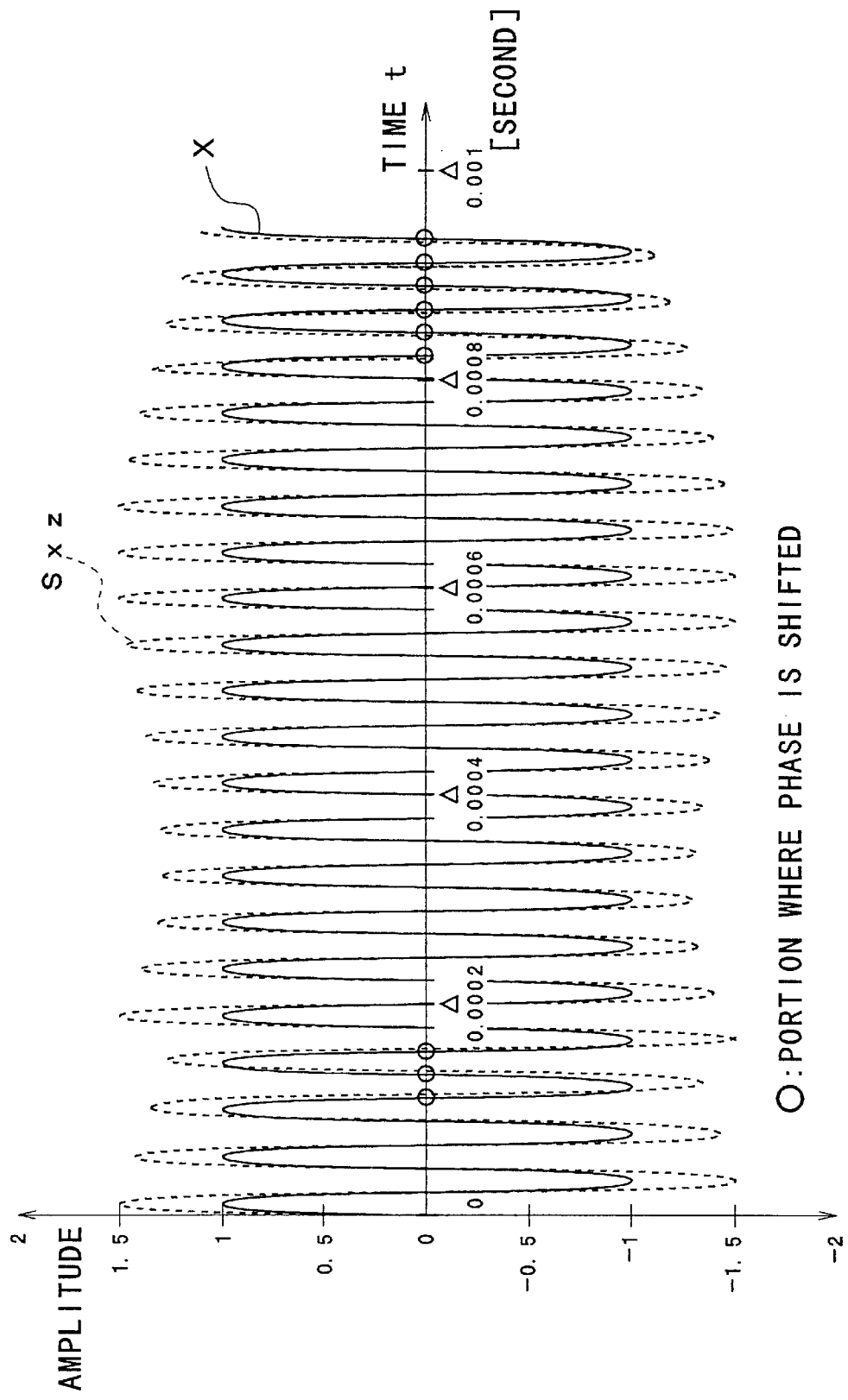

CONNECTION BIT 0

CONNECTION BIT 1

CONNECTION BIT 1

CONNECTION BIT 0

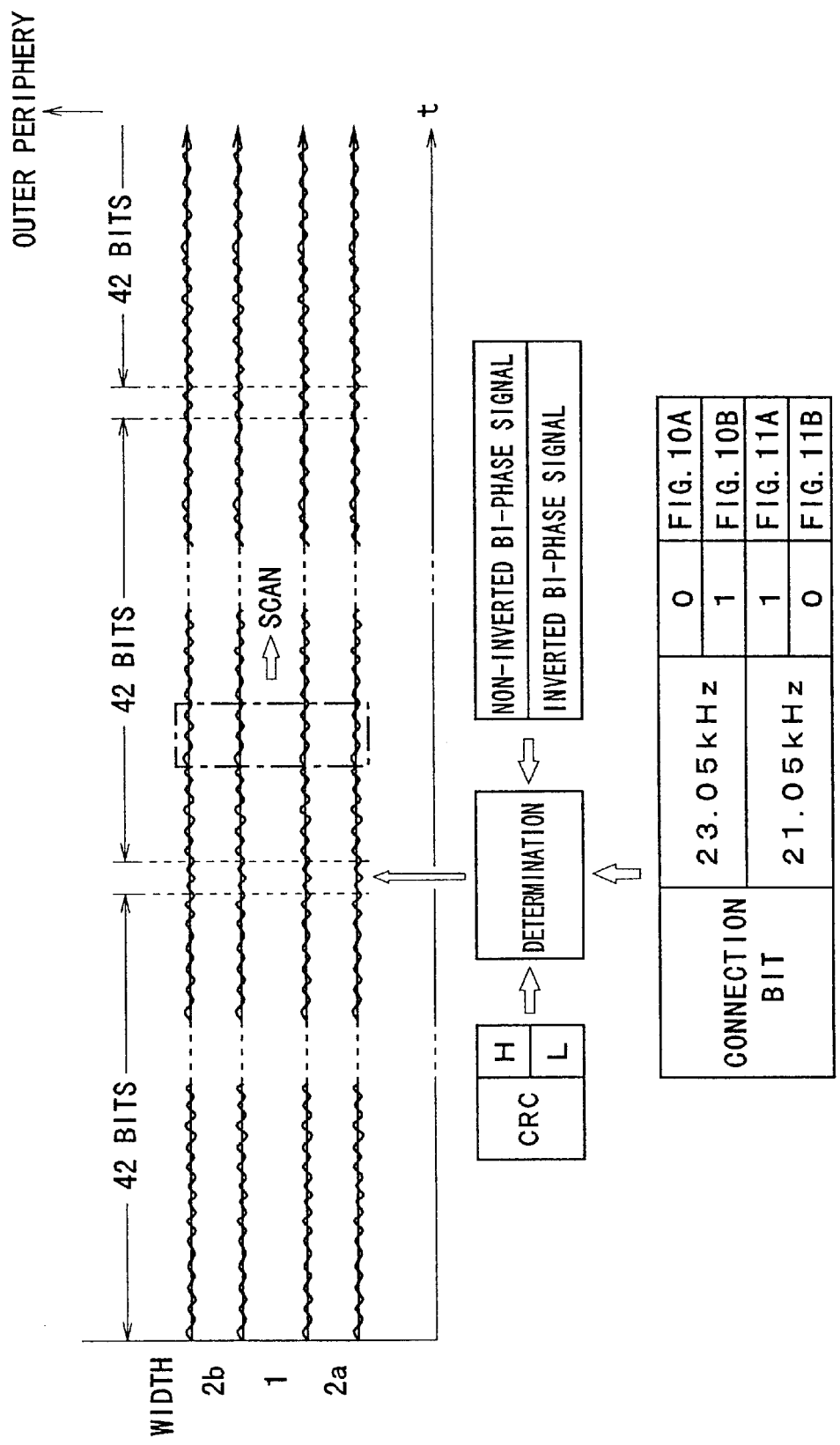

F I G. 1 5
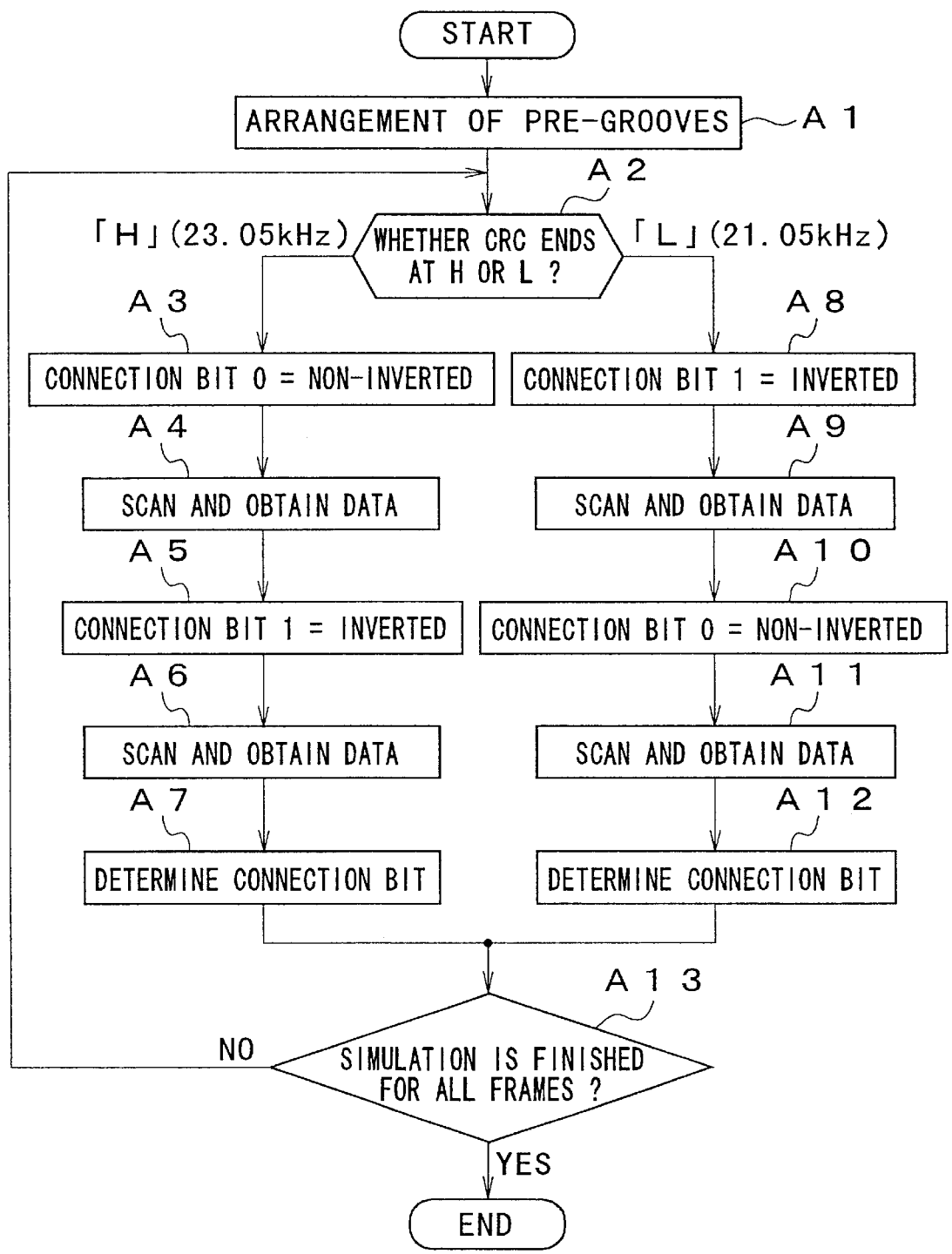

DISC-SHAPED RECORD MEDIUM, METHOD FOR MANUFACTURING THE SAME, AND APPARATUS FOR MANUFACTURING THE SAME

BACKGROUND OF THE INVENTION

1. Field of the Invention

The present invention relates to a disc-shaped record medium preferable as a writable optical disc such as a write once optical disc (CD-R), a rewritable optical disc (CD-RW), and a mini disc (MD), a method for manufacturing the same, and an apparatus for manufacturing the same.

Specifically, in the present invention, a simulation is conducted at the time of writing pre-format addresses in an original disc for the disc-shaped record medium. In the simulation, in order that the crosstalk caused by the coexistence of an arbitrary pre-format address with the other pre-format address adjacent to the arbitrary pre-format address in the inner and outer peripheral direction at the reading point of the arbitrary pre-format address, specific dummy information for timing adjustment is inserted beforehand between the pre-format address in the target frame and the pre-format address in the other frame next to the target frame. Based on the result of the simulation, the pregrooves and the lands are defined on the original disc. In thus-formed original disc, there is no problem in preventing crosstalk between adjacent pregrooves. By use of the original disc, it is possible to manufacture a writable optical disc having high storage density.

2. Description of the Related Art

In recent years, as information media for editing and recording audio information in such a manner as to suit the preferences of listeners, writable optical discs such as write once optical discs (CD-R) and rewritable optical discs (CD-RW) standardized in ISO/IEC13490-1 are increasingly used. In each of these optical discs 10, as shown in FIG. 1A, grooves 1 for guiding a light beam (hereinafter, referred to as pregrooves) are formed, and a positioning method referred to as a tracking servo is employed. The tracking servo is a mechanism where pits and projections constituting lands 2 formed on both sides of each pregroove 1 are detected to decide the position of an optical pickup, so that the desired pre-format address is accurately irradiated with a laser beam.

Sloped surfaces of the land, which coincide to side surfaces of the pregroove 1, is formed with a slight wobble in the form of sine wave in-phase with each other as shown in FIG. 1B. The wobble signal indicating the wobble component has been subjected to FM modulation. In the wobble signal, time axis information indicating the position on the optical disc 10, and a recommended value of the power of the laser beam optimum for recording, etc. are encoded.

The time axis information is referred to as ATIP (absolute time in pregroove) information, and is written as an absolute time in the signal recording region (i.e. a program region) of the optical disc 10 along a direction from the starting point at its inner peripheral side toward its outer peripheral side. The ATIP information is written in the processing of the CD-R and CD-RW. The ATIP information is written in the optical disc 10 such as CD-R and CD-RW in a modulation mode referred to as bi-phase modulation mode. In this mode, a baseband modulation is conducted where, depending on whether the waveform of the last pulse signal constituting the error correction information of the immediately preceding pre-format address ends at a high level or low level, the pre-format address in the next frame is connected without being inverted, or the pre-format address is inverted and connected.

The ATIP information is written, for example, in the side surfaces Us, Ut of the pregroove 1 between two lands 2a, 2b shown in FIG. 1B. That is, the ATIP information is written in the side surface Us of the land 2a located at the inner peripheral side of the pregroove 1 in which data is recorded, and in the side surface Ut of the land 2b located at the outer peripheral side of the pregroove 1 in such a manner that the ATIP information written in the side surface Us is synchronous to the ATIP information written in the side surface Ut.

Therefore, the ATIP information can be read as a wobble signal by detecting the wobble formed in the land 2b located at the outer peripheral side by the preceding side spot 3. The preceding side spot 3 is a light beam preceding a main spot 4 which is a light beam for recording information. The circle broken double lines in FIG. 1B show spot diameters of the light beam irradiated to the optical disc having a standard density. The broken circle line in FIG. 1B shows a spot diameter of a light beam for an optical disc with a standard density. The circle broken double lines shows a light beam of which irradiation diameter is relatively enlarged as the pregrooves are formed so as to be closer to each other in proportional to the increase in a storage density of the disc-shaped record medium 10. This problem arises because there is a limitation on enlarging the spot diameters of the light beam.

A wobble formed in the land 2a located at the inner peripheral side is detected as a wobble signal by the posterior side spot 5. The wobble signal is produced in such a manner that its center frequency becomes 22.05 kHz for example, when the optical disc 10 is rotated at a standard velocity (CLV) of a compact disc (CD). One sector of the ATIP information is constituted in such a manner as to coincide to one data sector after the signal is recorded. Therefore, at the time of recording information, the pregroove 1 is irradiated with a light beam with a predetermined intensity and information is written therein while the sector of the ATIP information is synchronous with the data sector.

In the bi-phase modulation mode according to a conventional example, when the error correction information for the bi-phase signal of the immediately preceding pre-format address ends at high level, a baseband modulation is conducted in such a manner that the bi-phase signal of the pre-format address having synchronous information starting at low level is connected. Contrary to this, when the error correction information for the bi-phase signal of the immediately preceding pre-format address ends at low level, a baseband modulation is conducted in such a manner that the bi-phase signal of the pre-format address having synchronous information starting at high level is connected.

If pre-format addresses are written in the bi-phase modulation mode as it is without conducting any processing in the recent situation where the lands 2a, 2b are arranged at narrower pitches P in accordance with the increase in the storage density of the optical disc 10 (hereinafter, referred to as a disc-shaped record medium in some cases), the light beam of which irradiation diameter is relatively enlarged as the pregrooves are formed so as to be closer to each other is applied across the adjacent pregrooves (see FIG. 1B). In this case, there arises much fear that crosstalk is generated. The crosstalk causes phase modulation to create jitter.

As a result, when the bi-phase signal constituting the target pre-format address at the reading point is superimposed on the bi-phase signal of the other pre-format address adjacent to the target pre-format address, there is a large difference in phases therebetween. Larger jitter is created as the period of high level is shorter.

SUMMARY OF THE INVENTION

The present invention has been conducted to solve the above-described problems of the prior arts, and the objective thereof is to provide a disc-shaped record medium usable for producing a writable optical disc which has high storage density and is capable of preventing crosstalk generated in adjacent pregrooves, a method manufacturing the same, and an apparatus for manufacturing the same.

The above-described problems can be solved by a disc-shaped record medium in which pre-format addresses are written along its grooves for guiding a light beam. In the disc-shaped record medium, in order that the crosstalk caused by the coexistence of an arbitrary pre-format address with the other pre-format address adjacent to the arbitrary pre-format address in the inner and outer peripheral direction at the reading point of the arbitrary pre-format address, specific dummy information for timing adjustment is inserted beforehand. The dummy information is recorded between the pre-format address in the target frame and the pre-format address in the other frame next to the target frame.

According to the disc-shaped record medium of the present invention, phase modulation caused by the crosstalk between adjacent pregrooves can be prevented even if a light beam is applied across the adjacent pregrooves when an arbitrary pre-format address is designated to write information in the pregroove, or the information is read from the pre-format address. As a result, a jitter can be suppressed. With this arrangement, it becomes possible to provide a rewritable optical disc such as a CD-R and CD-RW having high storage density in which the pregrooves 1 are arranged at pitches narrower than the irradiation diameter of the light beam.

A method for manufacturing a disc-shaped record medium of the present invention is a method in which pre-format addresses are written in its grooves for guiding a light beam, including the steps of: conducting a simulation where, in order that the crosstalk caused by the coexistence of an arbitrary pre-format address with the other pre-format address adjacent to the arbitrary pre-format address in the inner and outer peripheral direction at the reading point of the arbitrary pre-format address, specific dummy information for timing adjustment is inserted beforehand between the pre-format address in the target frame and the pre-format address in the other frame next to the target frame; producing a control signal for groove formation based on the result of the simulation; and causing a light beam with a predetermined intensity to oscillate on the original disc in its inner and outer peripheral direction while the original disc is rotated at a predetermined linear velocity to define pregrooves in the shape of pits and lands in the shape of projections on the original disc, thereby writing the pre-format addresses in the original disc.

According to the method for manufacturing a disc-shaped record medium of the present invention, at the time when the disc-shaped record medium in which pre-format addresses are written is manufactured, a simulation is conducted where, in order that the crosstalk caused by the coexistence of an arbitrary pre-format address with the other pre-format address adjacent to the arbitrary pre-format address in the inner and outer peripheral direction at the reading point of the arbitrary pre-format address, specific dummy information for timing adjustment is inserted beforehand between the pre-format address in the target frame and a pre-format address in the other frame next to the target frame.

With this arrangement, a control signal for groove formation intended for the case where an arbitrary pre-format address is designated and information is written in the pregroove, and the information is read from the address is produced. The control signal for groove formation is capable of removing the influence of crosstalk generated at the time when a light beam is applied across the adjacent pregrooves. By writing the pre-format addresses based on the control signal, it is possible to manufacture a write once optical disc having high storage density in which the pregrooves are arranged at pitches narrower than the irradiation diameter of the light beam with excellent reproducibility.

According to an apparatus for manufacturing a disc-shaped record medium in which pre-format addresses are written along its grooves for guiding a light beam of the present invention, including: a data processor for conducting a simulation where, in order that the crosstalk caused by the coexistence of an arbitrary pre-format address with the other pre-format address adjacent to the arbitrary pre-format address in the inner and outer peripheral direction at the reading point of the arbitrary pre-format address, specific dummy information for timing adjustment is inserted beforehand between the pre-format address in the target frame and the pre-format address in the other frame next to the target frame; a signal generator for producing a control signal for groove formation based on the result of the simulation by the data processor; and an information writer for causing a light beam with a predetermined intensity to oscillate on the original disc in its inner and outer peripheral direction while the original disc is rotated at a predetermined linear velocity to define pregrooves in the shape of pits and lands in the shape of projections on the original disc, thereby writing the pre-format addresses in the original disc.

According to an apparatus for manufacturing a disc-shaped record medium of the present invention, at the time when the disc-shaped record medium in which at least pre-format addresses are written in its grooves for guiding a light beam, the data processor conducts a simulation where, in order that the crosstalk caused by the coexistence of an arbitrary pre-format address with the other pre-format address adjacent to the arbitrary pre-format address in the inner and outer peripheral direction at the reading point of the arbitrary pre-format address, specific dummy information for timing adjustment is inserted beforehand between the pre-format address in the target frame and the pre-format address in the other frame next to the target frame. After that, the signal generator generates a control signal for groove formation based on the result of the simulation conducted by the data processor.

For example, the control signal for groove formation is produced in such a manner that, when the waveform of the last pulse signal constituting the error correction information of the immediately preceding pre-format address ends at high level, a waveform of pulse signal constituting dummy information for timing adjustment is connected so that a waveform of a pulse signal constituting a pre-format address in the next frame including synthetic information starting at high level or low level is connected.

The control signal is input into the information writer. In the information writer, based on the control signal, a light beam with a predetermined intensity is caused to oscillate on the original disc in its inner and outer peripheral direction. At the same time, the original disc is rotated at a predetermined linear velocity. In this manner, the pregrooves and lands are defined on the original disc. As a result of these processes, pre-format address are written in the original disc.

With this arrangement, it is possible to manufacture a disc-shaped record medium free from the influence of crosstalk even if a light beam is applied across the adjacent pregrooves. In addition, it is possible to manufacture a writable optical disc having high storage density in which the pregrooves are arranged at pitches narrower than the irradiation diameter of the light beam.

BRIEF DESCRIPTION OF THE DRAWINGS

FIG. 2 is a perspective view of a disc-shaped record medium 100 which is partially fractured for showing its exemplary structure according to an embodiment of the present invention;

FIGS. 4A to 4C are diagrams of data raws and waveforms for showing the relationship between ATIP information, a bi-phase signal DBP, and a wobble signal SWB;

FIGS. 7A and 7B are diagrams respectively showing exemplary waveforms of non-inverted bi-phase signal DBP and inverted bi-phase signal DBP constituting a pre-format address in one frame;

FIGS. 8A to 8E are diagrams of pulse waveforms showing an exemplary crosstalk between a bi-phase signal X constituting the pre-format address and adjacent pregrooves;

FIG. 9 is a diagram showing a wobble waveform showing a comparison between the bi-phase signal X to be evaluated and a synthetic waveform signal Sxy;

FIG. 10 is a diagram showing a wobble waveform showing a comparison between the bi-phase signal X to be evaluated and a synthetic waveform signal Sxy;

FIG. 14 is a diagram showing an image of exemplary arrangement of pregrooves in a data processor;

FIG. 15 is a flow chart showing a simulation processing in a data processor;

DESCRIPTION OF THE PREFERRED EMBODIMENT

Figure 1A:
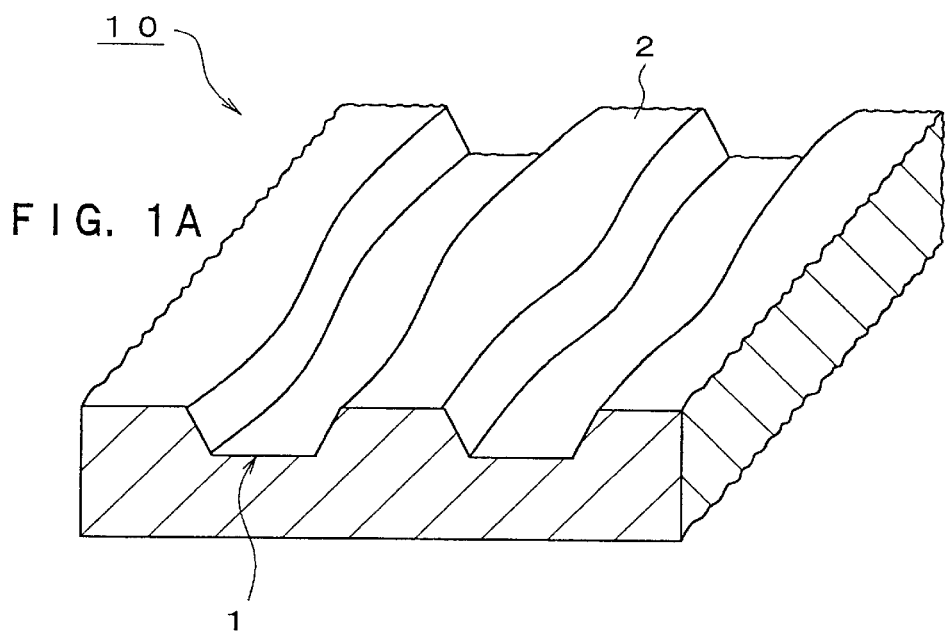
FIG. 1A is a perspective diagram showing an exemplary structure of an optical disc according to a conventional example.
Figure 1B:
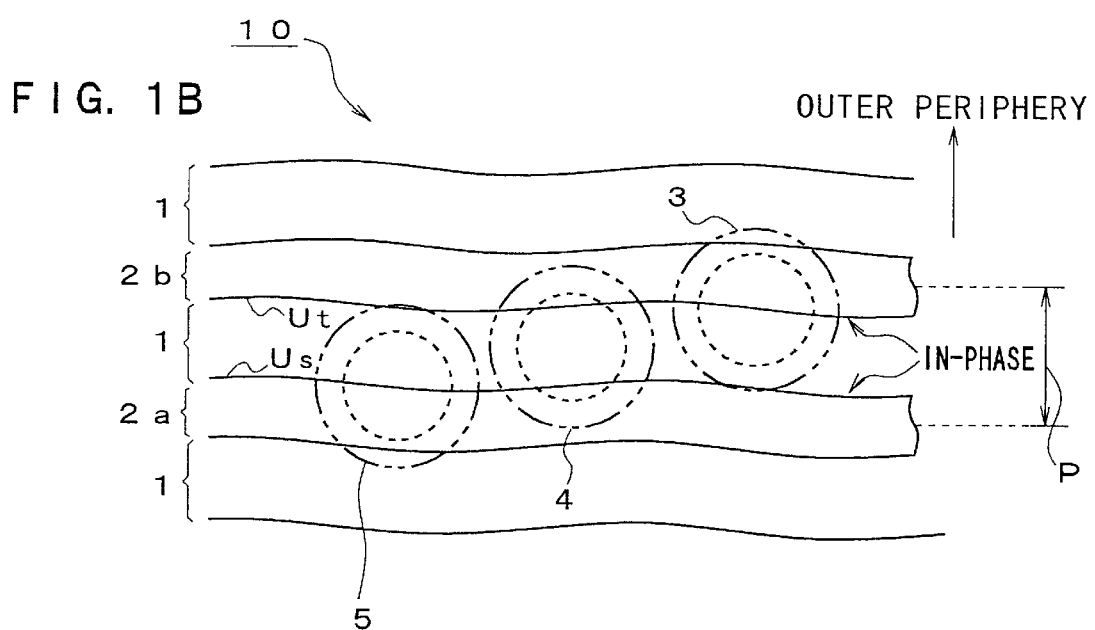
FIG. 1B is a plan view showing an exemplary structure thereof.

Next, a disc-shaped record medium, a method for manufacturing the same, and an apparatus for manufacturing the same according to an embodiment of the present invention will be described referring to the drawings.

(1) A Disc-shaped Record Medium

FIG. 2 is a perspective view of a disc-shaped record medium which is partially fractured for showing its exemplary structure according to an embodiment of the present invention.

In this embodiment, a simulation for reducing crosstalk is performed in the process of manufacturing an original disc for the disc-shaped record medium. Based on the result of the simulation, a control signal for groove formation is produced, and pre-format addresses are written in the original disc by the control signal. The disc-shaped record medium is manufactured using the original disc.

The disc-shaped record medium 100 shown in FIG. 2 is a write once optical disc (CD-R) or a rewritable optical disc (CD-RW). The disc-shaped record medium 100 has pregrooves which spirally extend from the inner peripheral section toward the outer peripheral section around a hole 6 for fastening the record medium as a center. When data (i.e. information) is recorded and reproduced, a laser beam is induced along the pregrooves 1. The pregrooves 1 are defined (i.e. partitioned) by lands 2 as shown in the enlarged drawing of the plain surface of the disc-shaped record medium 100, and are slightly serpentine in the form of sine wave (hereinafter, referred to as wobble).

The disc-shaped record medium 100 has, as shown in the enlarged drawing of its cross section, a discoid substrate 11 formed with pregrooves 1 in the form of pits defined by lands 2 in the form of projections. Each pregroove 1 has at least a pigment layer 12, and a reflection layer 13 made of gold and the like is formed on the land 2 and the pregroove 1 so as to cover the pigment layer 12. On the reflection layer 13, a protective layer 14 is formed for the purpose of protection. In this manner, an optical disc 10 such as CD-R and CD-RW is constituted.

Figure 3A:
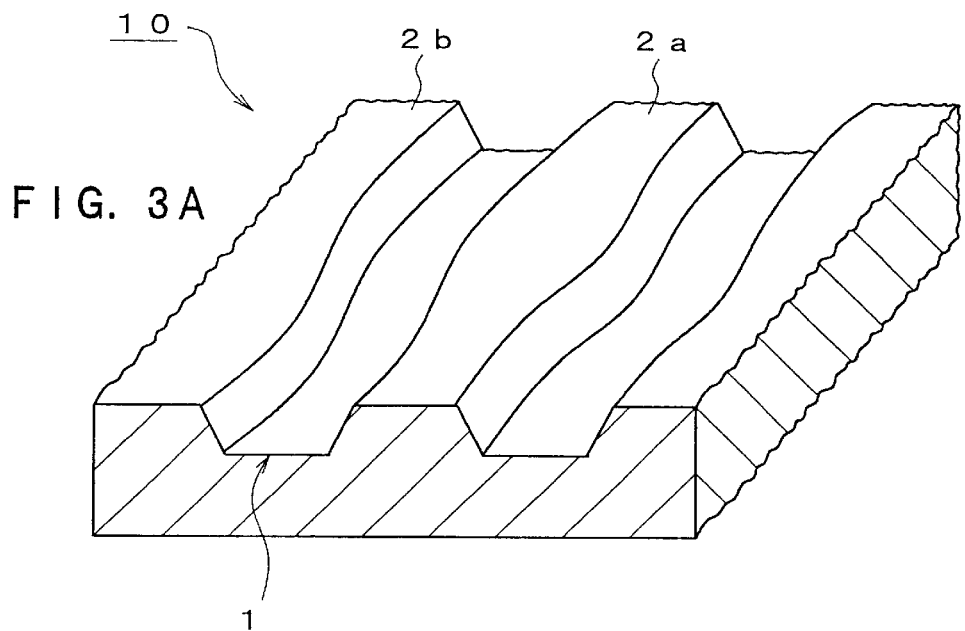
FIG. 3A is a perspective view showing an exemplary structure of pregrooves 1 defined by lands 2.
Figure 3B:
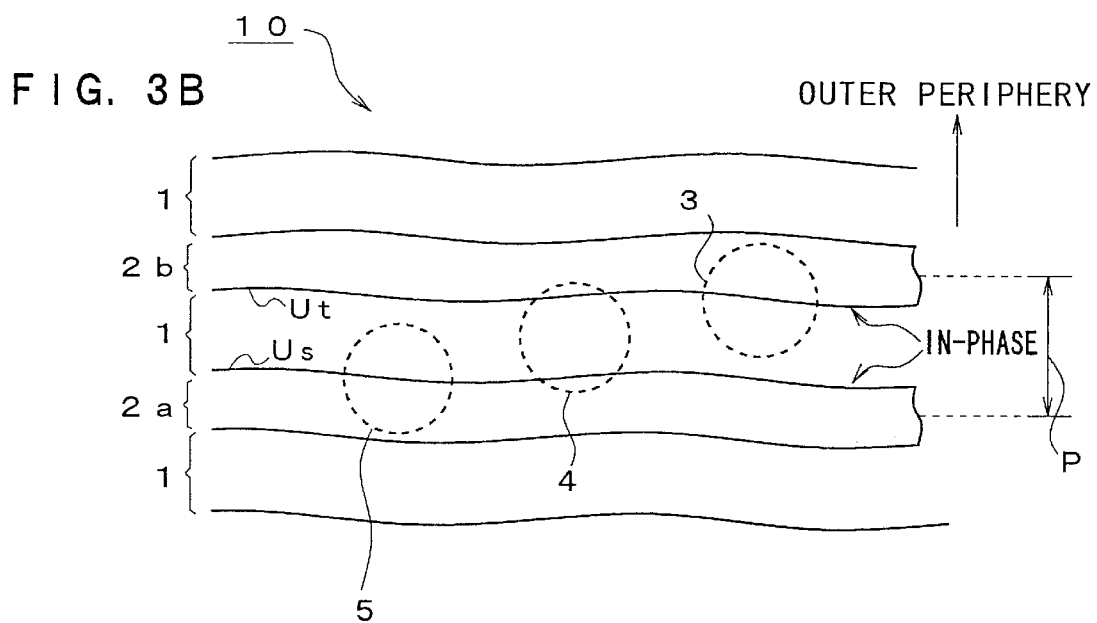
FIG. 3B is a top view showing an exemplary light beam scan at the time of reading ATPI information.

In an exemplary structure of the disc-shaped record medium 100 shown in FIG. 3A, a land 2 is defined as a portion between two adjacent pregrooves 1. Both side surface of the pregroove 1, which coincides to each sloped surface of the land 2, is formed with a slight wobble in the form of sine wave, as shown in an example of a light beam scan of FIG. 3B. The wobble component is based on the control signal (hereinafter, referred to as a wobble signal) SWB for groove formation at the time of manufacturing the original disc for the disc-shaped record medium 100, and has been subjected to FM modulation. The circle broken lines in FIG. 3B show spot diameters of the light beam, and indicate the case where the irradiation diameters thereof are relatively enlarged as the pregrooves are formed so as to be closer to each other in proportional to the increase in a storage density of the disc-shaped record medium 100.

In the manufacturing of the original disc for the disc-shaped record medium 100, a simulation is conducted to know the characteristic of control signal SWB for groove formation which is to be used for writing pre-format addresses in the original disc as a signal effective in reducing the crosstalk between adjacent pregrooves 1 to a minimum value. The crosstalk is considered to be caused by the coexistence of an arbitrary pre-format address with the other pre-format address adjacent to the arbitrary address in the inner and outer peripheral direction at the reading point of the arbitrary pre-format address. Defining the spot diameter of the light beam to be at a constant value, as lands 2 are arranged at narrower pitch P in accordance with the demand for recording information in higher density, the disc is proportionally compacted. As a result of this, crosstalk is easily generated.

In this simulation, specific dummy information for timing adjustment is inserted beforehand between a pre-format address in the target frame and a pre-format address in the other frame next to the target frame. In this manner, a bi-phase signal (i.e. a pulse signal) DBP which allows the crosstalk between adjacent pregrooves 1 is reduced to a minimum value can be found. The bi-phase signal DBP is a signal obtained by conducting baseband modulation referred to as bi-phase (hereinafter, simply referred to as bi-phase modulation in some cases) for the pre-format addresses.

After that, based on the bi-phase signal DBP obtained from the result of the simulation, the control signal SWB for groove formation is produced. Based on the control signal SWB, a light beam with a predetermined intensity is caused to oscillate on the original disc in its inner and outer peripheral direction. At the same time, grooves are formed on the original disc in the state where the original disc is rotated at a predetermined linear velocity to define the pregrooves 1 and the lands 2 on the original disc. As a result of these processes, in the original disc, pre-format address (hereinafter, referred to as time axis information in some cases) are written, and a recommended value of the power of the laser beam optimum for recording is encoded. By use of thus-obtained original disc, the disc-shaped record medium 100 is produced.

The time axis information is constituted by at least synchronization information, minutes information, second information, frame information, and error correction information in one frame. Hereinafter, the time axis information for all frames is referred to as ATIP (absolute time in pregroove) information in some cases. The ATIP information is written, for example, in the both side surfaces Us, Ut of the pregroove 1 between two lands 2a, 2b shown in FIG. 3B, that is, in the side surface Us of the land 2a located at the inner peripheral side of the pregroove 1, and in the side surface Ut of the land 2b located at the outer peripheral side of the pregroove 1 in such a manner that the ATIP information in the side surface Us is synchronous with the ATIP information written in the side surface Ut. Therefore, each ATIP information can be read as a wobble signal SWB by detecting the wobble formed in the land 2b located at the outer peripheral side at a preceding side spot 3.

The preceding side spot 3 is a light beam preceding a main spot 4 which is a light beam for information recording. The wobble formed in the land 2a located at the inner peripheral side is detected as a wobble signal SWB by a posterior side spot 5. The wobble signal SWB is produced in such a manner that its center frequency becomes 22.05 kHz for example, when the disc is rotated at a standard velocity (CLV) of a compact disc (CD). One sector of the ATIP information is constituted in such a manner as to coincide to one data sector (2352 byte) after the signal is recorded. Therefore, at the time of recording information, data is written in the state where the sector of the ATIP information is synchronous with the data sector. For example, when a pre-format address is designated, the pregroove 1 is irradiated with a light beam with a predetermined intensity, and the information is written.

An exemplary relationship between the ATIP information, bi-phase signal DBP, and the wobble signal SWB is described. The ATIP information shown in FIG. 4A is subjected to bi-phase modulation, and is adjusted so that the logical levels "1" and "0" are exchanged with each other per a predetermined period, and also the average numbers of "1" and "0" become identical to each other. As a result of the bi-phase modulation, a bi-phase signal DBP shown in FIG. 4B is obtained. The bi-phase signal DBP is then subjected to FM modulation to be a wobble signal (i.e. a control signal for groove formation) SWB. That is, FM modulation is conducted in such a manner that, when the logical level of the bi-phase signal DBP is "1", the frequency is adjusted to 23.05 kHz, and when the logical level of the bi-phase signal DBP is "0", the frequency is adjusted to 21.05 kHz. As a result, the wobble signal SWB shown in FIG. 4C having a carrier signal which has been subjected to FM modulation in such a manner that its center frequency is 22.05 kHz as described above is produced.

As described above, in the disk-shaped record medium 100 according to the embodiment of the present invention, phase modulation caused by the crosstalk between adjacent pregrooves 1 can be prevented even if a light beam is applied across the adjacent pregrooves 1 when an arbitrary pre-format address is designated to write information in the pregroove 1, or the information is read from the pre-format address. As a result, jitter can be suppressed. With this arrangement, it becomes possible to provide a writable optical disc 10 such as CD-R and CD-RW having high storage density in which the pregrooves 1 are arranged at pitches narrower than the irradiation diameter of the light beam.

(2) An Apparatus for Manufacturing the Disc-shaped Record Medium

Figure 5:
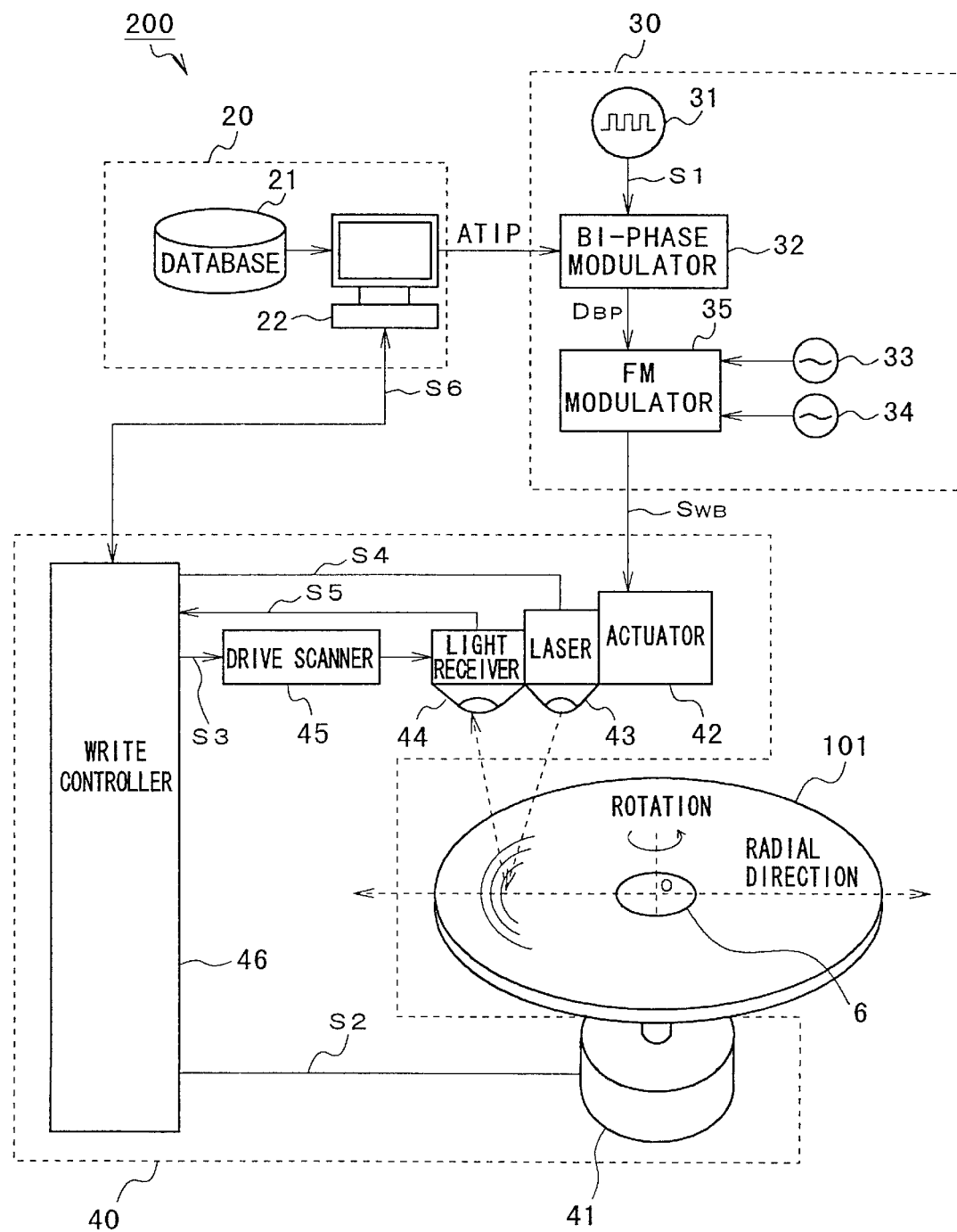
FIG. 5 is a block diagram showing an exemplary structure of an apparatus 200 for manufacturing the disc-shaped record medium according to an embodiment of the present invention.

FIG. 5 is a block diagram showing an exemplary structure of an apparatus 200 for manufacturing the disc-shaped record medium according to an embodiment of the present invention.

In this embodiment, a simulation is conducted at the time of writing pre-format addresses in an original disc for the disc-shaped record medium. In the simulation, in order that the crosstalk caused by the coexistence of an arbitrary pre-format address with the other pre-format address adjacent to the arbitrary pre-format address in the inner and outer peripheral direction at the reading point of the arbitrary pre-format address, specific dummy information for timing adjustment is inserted beforehand between the pre-format address in the target frame and the pre-format address in the other frame next to the target frame. Based on the result of the simulation, the pregrooves 1 and the lands 2 are defined on the original disc. In thus-formed original disc, there is no problem in preventing crosstalk between adjacent pregrooves 1. By use of the original disc, it is possible to manufacture a writable optical disc having high storage density.

The apparatus 200 for manufacturing the disc-shaped record medium shown in FIG. 5 is an apparatus for manufacturing an original disc 101 in which pre-format addresses constituted by at least synchronous information, minutes information, second information, frame information, and error correction information in one frame are written in the grooves for guiding a light beam. It is obvious that the original disc 101 is not limited to the disc in which the pre-format addresses constituted by these kinds of information, but may be a disc in which pre-format addresses constituted by a sector number and a cluster number are written. The disc-shaped record medium 100 is manufactured using the original disc 101.

The manufacturing apparatus 200 shown in FIG. 5 has a data processor 20. The data processor 20 conducts a simulation where, in order that the crosstalk caused by the coexistence of an arbitrary pre-format address with the other pre-format address adjacent to the arbitrary pre-format address in the inner and outer peripheral direction at the reading point of the arbitrary pre-format address, specific dummy information for timing adjustment is inserted beforehand between the pre-format address in the target frame and the pre-format address in the other frame next to the target frame. The data processor 20 includes a database 21, a personal computer (hereinafter, referred to as PC) 22, and the like.

A signal generator 30 is connected to the data processor 20. The signal generator 30 generates a control signal SWB for groove formation based on the result of the simulation. The control signal SWB is a combination of sine wave signals each of which is obtained by frequency-modulating a carrier signal at a frequency of 22.05 kHz with a frequency of ±1 kHz based on the pulse signal obtained after the pre-format address is subjected to baseband modulation in a bi-phase modulation mode.

The signal generator 30 has, for example, a pulse generator 31, a bi-phase modulator 32, an oscillator for 22.05 kHz, an oscillator 34 for 1 kHz, and an FM modulator 35. The ATIP information is supplied from the above-described PC 22 to the bi-phase modulator 32. A reference pulse signal S1 is supplied from the pulse generator 31 to the bi-phase modulator 32. In the bi-phase modulator 32, the reference pulse signal S1 is subjected to bi-phase modulation based on the ATIP information to be a bi-phase signal DPB, and the bi-phase signal DPB is output from the bi-phase modulator 32.

The FM modulator 35 is connected to the bi-phase modulator 32, and the bi-phase signal DBP is supplied from the bi-phase modulator 32 to the FM modulator 35. The oscillator 33 for 22.05 kHz and the oscillator for 1 kHz are connected to the FM modulator 35. The carrier wave signal at a frequency of 22.05 kHz and the sine wave signal at a frequency of 1 kHz are supplied to the FM modulator 35. In the FM modulator 35, the carrier wave signal at a frequency of 22.05 kHz is frequency-modulated by the sine wave signal at a frequency of 1 kHz based on the bi-phase signal DBP to produce a control signal (i.e. a wobble signal) SWB for groove formation.

An information writer 40 is connected to the signal generator 30. In the information writer 40, pre-format addresses are written based on the control signal SWB for groove formation. The information writer 40 has, for example, a spindle motor 41, an actuator 42, a laser emission source 43, a light receiver 44, a drive scanner 45, a write controller 46, and the like.

The original disc 101 for the disc-shaped record medium 100 is mounted to the spindle motor 41, and is operated to rotate at a standard velocity of a CD (CLV) (i.e. a specified linear velocity) based on the motor control signal S2. The motor control signal S2 is supplied from the write controller 46 to the spindle motor 41. The actuator 42, the laser emission source 43, and the light receiver 44 described above together constitute a normal optical pickup. Based on the drive control signal S3, the drive scanner 45 drives the optical pickup to scan the original disc 101 in its radial direction. The drive control signal S3 is supplied from the write controller 46 to the drive scanner 45.

A laser control signal S4 is supplied from the above-described write controller 46 to the laser emission source 43. The laser emission source 43 is controlled so as to emit a light beam with a specified intensity. A control signal SWB for groove formation is supplied from the FM modulator 35 to the actuator 42. The actuator 42 causes the light beam with a specified intensity to oscillate on the original disc 101 in its inner and outer peripheral direction. As the light receiver 44, a quadrant photodetector is used. The light receiver 44 detects whether or not the grooves are formed on the original disc 101, and produces a groove formation detecting signal S5. The groove formation detecting signal S5 is output to the write controller 46. The write controller 46 is connected to the above-described PC 22. The write controller 46 conducts a control where, based on a write control signal S6 supplied from the PC 22, the original disc 101 is allowed to rotate at a specified linear velocity with a light beam with a specified intensity, and the optical pickup is driven to scan the original disc in its radial direction. In this manner, the pregrooves 1 and the lands 2 are defined, and the pre-format addresses are written.

Next, an exemplary frame structure of the ATIP information constituting the pre-format addresses, and exemplary structures of non-inverted and inverted bi-phase signals DBP will be described.

Figure 6:
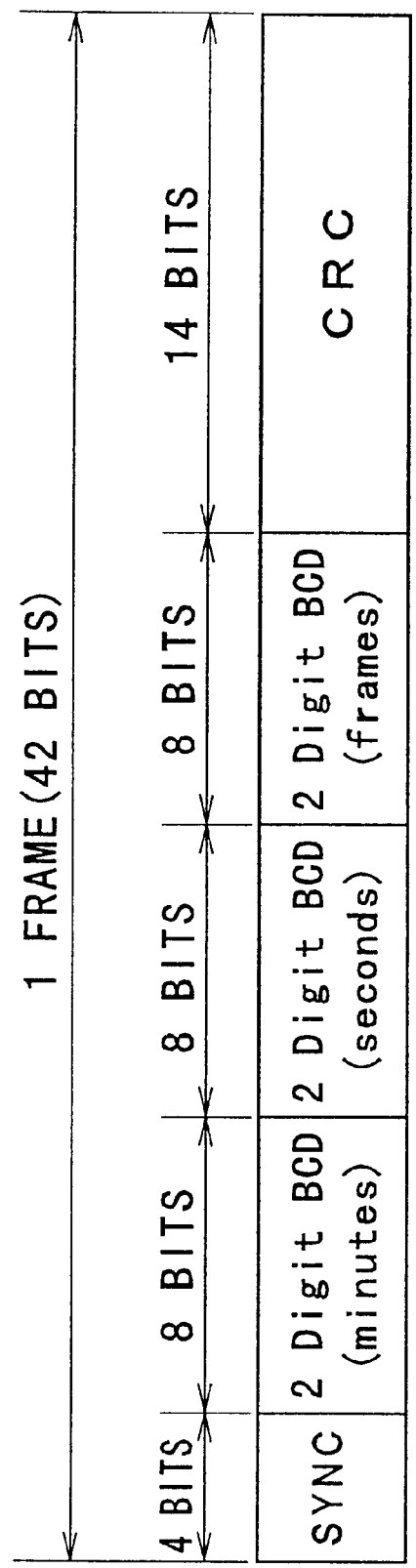
FIG. 6 is a data format showing an exemplary frame structure of ATIP information constituting a preformat address in one frame.

In the ATIP information shown in FIG. 6, the first four bits constitute synchronous information which is a synchronous signal SYNC. The next eight bits constitute minute information indicated by 2 digit BCD. The subsequent eight bits constitute second information indicated by 2 digit BCD. The further subsequent eight bits constitute frame information indicated by 2 digit BCD. The last 14 bits constitute error correction information indicated by cyclic redundancy code (CRC). The pre-format address in one frame is constituted by 42 bits. The information as the recommended value of the power of the laser beam optimum for recording is multiplexed so as to be contained in the time axis information at a certain ratio.

The non-inverted bi-phase signal DBP shown in FIG. 7A has a pulse waveform obtained by conducting a bi-phase modulation for the pre-format addresses in one frame. The inverted bi-phase signal DBP (the upper bar is omitted) shown in FIG. 7B has a pulse waveform obtained by inverting the pulse waveform shown in FIG. 7A. In this embodiment, the data processor 20 conducts a baseband modulation in the bi-phase modulation mode for the reference pulse signal S1 where the non-inverted bi-phase DBP shown in FIG. 7A is connected as it is, or the inverted bi-phase signal DBP having a pulse waveform obtained by inverting the pulse waveform of the non-inverted bi-phase DBP is connected, depending on whether the waveform of the last pulse signal constituting the error correction information of the immediately preceding pre-format address is at a high level (hereinafter, referred to as a H level) or at a low level (hereinafter, referred to as a L level). Before this processing conducted by the data processor 20, a simulation is conducted where dummy information for timing adjustment is inserted beforehand between a pre-format address in a target frame and a pre-format address in the other frame next to the target frame. In this manner, a bi-phase signal (i.e. a pulse signal) DBP which reduces the crosstalk between adjacent pregrooves 1 to a minimum value can be found.

Next, the bi-phase signal DBP constituting the target pre-format address, and an exemplary crosstalk between adjacent pregrooves will be described.

FIG. 8A is a diagram showing a pulse waveform of a bi-phase signal X which is produced in the pregroove and constitutes the pre-format address to be evaluated. When the bi-phase signal X to be evaluated is synthesized with a bi-phase signal Y produced in the adjacent pregroove shown in FIG. 8B, that is, when the exclusion logical sum of the bi-phase signal X and the bi-phase signal Y is inverted, a synthetic waveform signal Sxy having a relatively long H level is observed as shown in FIG. 8D.

$$Sxy=(\overline{X+Y})(X+\overline{Y})$$

The bi-phase signal Y is synthesized having a phase slightly different from that of the bi-phase signal X to be evaluated. The synthetic waveform signal Sxy having a long H level is evaluated as receiving only small influence of crosstalk.

When the bi-phase signal X to be evaluated is synthesized with the bi-phase signal Z (having a waveform obtained by inverting the waveform of the bi-phase signal Y) produced in the adjacent pregroove shown in FIG. 8C, a synthetic waveform signal Sxz having extremely short H level is observed as shown in FIG. 8E.

$$Sxy=X\overline{Y}+\overline{X}Y$$

The synthetic waveform signal Sxz having a short H level is evaluated as receiving a large influence of crosstalk. There are some cases where the bi-phase signal X to be evaluated is phase-modulated by the synthetic waveform signal Sxy.

FIG. 9 is a diagram showing a wobble waveform based on the bi-phase signal X to be evaluated, and a wobble waveform based on the synthetic waveform signal Sxy. As shown in FIG. 9, these wobble waveforms are substantially in-phase with each other, and have the same zero intersections with each other, although there is a difference in amplitudes therebetween. Almost no influence of crosstalk is created at the time of decoding the pre-format addresses.

Contrary to the above, when the wobble waveform based on the bi-phase signal X to be evaluated, and the wobble waveform based on the synthetic waveform signal Sxz are observed as shown in FIG. 10, there is a difference in phases between these wobble waveforms. There are portions where zero intersections of the wobble waveforms are not coincide to each other, and the amplitude of the synthetic waveform signal Sxz is modulated. There is a strong influence of crosstalk at the time of decoding the pre-format addresses in the target frame. As a result, there is a fear that the recording and reproducing apparatus may misread the pre-format addresses.

In order to avoid such troubles as described above, in this embodiment, as shown in FIGS. 11A, 11B and 12A, 12B, four kinds of specific dummy information (hereinafter, referred to as connection bits) for timing adjustment are prepared. The connection bit 0 or 1 is inserted in such a manner that the non-inverted bi-phase DBP shown in FIG. 7A is connected as it is, or the inverted bi-phase signal DBP having a pulse waveform obtained by inverting the pulse waveform of the non-inverted bi-phase DBP is connected, depending on whether the waveform of the last pulse signal constituting the error correction information of the immediately preceding pre-format address ends at a H level or at a L level (hereinafter, it is expressed by an expression "the last bit of CRC is 1 or 0" in some cases.)

Figure 11A:
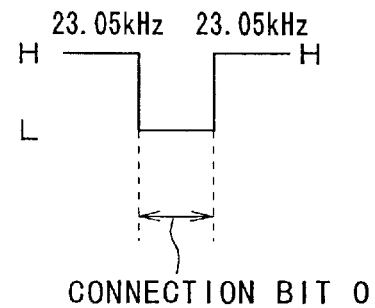
FIGS. 11A and 11B are diagrams respectively showing an exemplary waveform of connection bits (0) and (1) at the time when the immediately preceding bi-phase signal is "H" level (23.05 kHz)

In this embodiment, the connection bit 0 having a single pulse waveform shown in FIG. 11A is selected when the immediately preceding bi-phase signal DBP has a pulse waveform at a H level (23.05 kHz), and the non-inverted bi-phase signal DBP having the synchronous information shown in FIG. 7A starting from the H level is connected. The connection bit 0 shown in FIG. 11A has a waveform falling from the H level to the L level, and then raising to the H level.

Figure 11B:
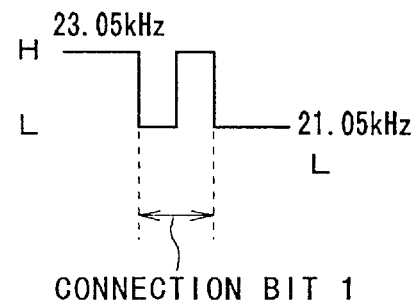

Similarly, when an inverted bi-phase signal DBP having a synchronous information shown in FIG. 7B starting form the L level, the connection bit 1 shown in FIG. 11B is selected. The connection bit 1 shown in FIG. 11B has a pulse waveform for one cycle with a pulse width about a half of the pulse width of the connection bit 0 shown in FIG. 11A. That is, the connection bit 1 shown in FIG. 11B has a waveform falling from the H level to the L level, and then raising to the H level, and again falling to the L level.

Figure 12A:
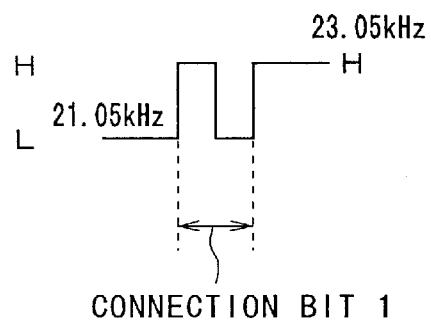
FIGS. 12A and 12B are diagrams respectively showing an exemplary waveform of connection bits (0) and (1) at the time when the immediately preceding bi-phase signal is "H" level (21.05 kHz)

The connection bit 1 having a pulse waveform shown in FIG. 12A is selected when the immediately preceding bi-phase signal DBP has a pulse waveform at a L level (21.05 kHz), and the non-inverted bi-phase signal DBP having the synchronous information shown in FIG. 7A starting from the H level is connected. The connection bit 1 shown in FIG. 12A has a pulse waveform which is obtained by inverting the pulse waveform of the connection bit 1 shown in FIG. 11B. That is, the connection bit 1 shown in FIG. 12A has a waveform raising from the L level to the H level, and then falling to the L level, and again raising to the H level.

Figure 12B:
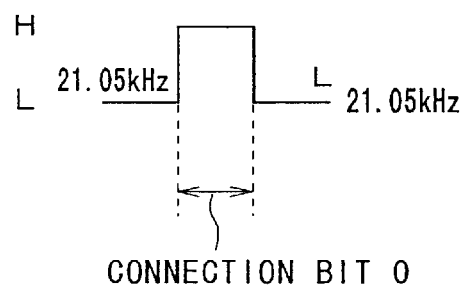

Similarly, when an inverted bi-phase signal DBP having a synchronous information shown in FIG. 7B starting form the L level, the connection bit 0 shown in FIG. 12B is selected. The connection bit 0 shown in FIG. 12B has a pulse waveform obtained by inverting the waveform of the pulse waveform of the connection bit 0 shown in FIG. 11A. That is, the connection bit 0 shown in FIG. 12B has a waveform raising from the L level to the H level, and then falling to the L level.

Figure 13:
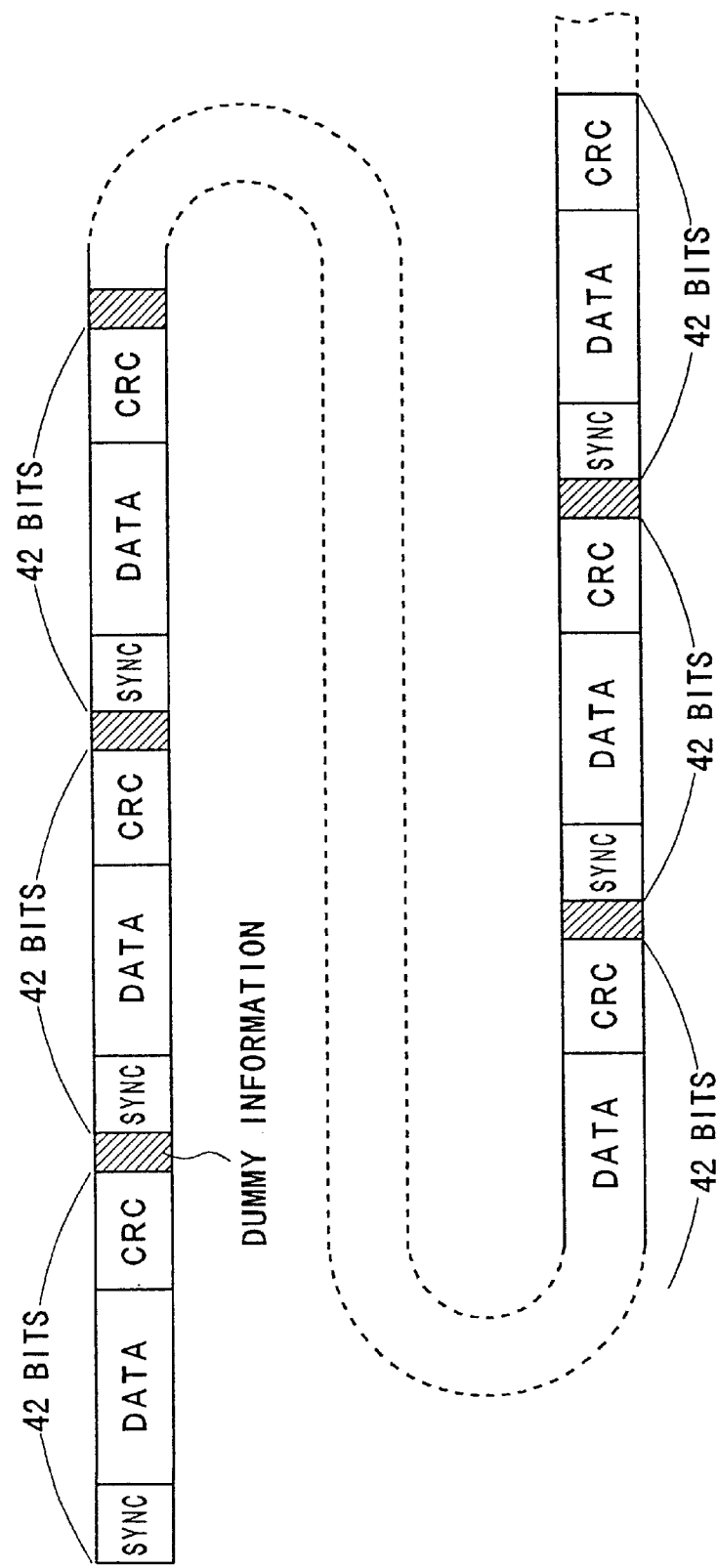
FIG. 13 is a diagram showing an image of exemplary data raws of ATIP information in which dummy information for timing adjustment is inserted between pre-format addresses constituted by 42 bits/frame.

FIG. 13 is a diagram showing an image of exemplary data raws of ATIP information in which dummy information for timing adjustment is inserted between pre-format addresses constituted by 42 bits/frame. In this embodiment, any one selected from four dummy information for timing adjustment shown in FIGS. 11A, 11B and 12A, 12B is inserted between pre-format addresses shown in FIG. 13 in accordance with the simulation conducted by the data processor 20.

Next, the simulation processing conducted by the data processor 20 will be described.

FIG. 14 is a diagram showing an image of exemplary arrangement of pregrooves 1 in a data processor. In this embodiment, before the pre-format addresses are written in the original disc 101 for the disc-shaped record medium 100, the pregrooves 1 in which the ATIP information for all frames are to be written are arranged on one line shown in FIG. 14 in the PC 22, and a simulation is conducted. Each pregroove 1 is arranged together with the lands 2a, 2b on its both sides. The reading point of an arbitrary pre-format address is rectangular information shown by an alternate long and short dashed line in FIG. 14, and is scanned in the radial direction so as to correspond to the position irradiated with the light beam. The crosstalk caused by the coexistence of an arbitrary pre-format address with the other pre-format address adjacent to the arbitrary pre-format address in the inner and outer peripheral direction at the reading point of the arbitrary pre-format address is observed.

In this embodiment, a connection bit prepared beforehand is connected between the pre-format address in the target frame and the pre-format address in the other frame next to the target frame, depending on the logical value (0 or 1) of the last bit of CRC at the reading point of an arbitrary pre-format address. The data processor 20 determines the connection pit which reduces the crosstalk caused by the coexistence of an arbitrary pre-format address with the other pre-format address adjacent to the arbitrary address in the inner and outer peripheral direction to a minimum value.

FIG. 15 is a flow chart showing an exemplary simulation processing conducted by the data processor 20. First, in Step A1 of the flowchart shown in FIG. 15, a pregroove 1 in which ATIP information for all frames is written is arranged on one line in the PC 22 (see FIG. 14).

Then, the procedure proceeds to Step A2. In Step A2, the calculator in the PC 22 determines whether or not the logical value of the last bit of CRC of the pre-format address in the target frame is 1 (23.05 kHz), or the logical value of the bit is 0 (21.05 kHz). When the logical value of the last bit of CRC of the pre-format address in the target frame is 1, the procedure proceeds to Step A3 where the connection bit 0 shown in FIG. 11A for example is connected to select the non-inverted bi-phase signal DBP. After that, the procedure proceeds to Step A4 where the scan is conducted by a laser beam in such a manner that the laser beam extends off the lands 2a, 2b partitioning the target pre-groove 1 to obtain a synthetic signal.

After that, the procedure proceeds to Step A5 where the connection bit 1 shown in FIG. 11B is connected to select the inverted bi-phase signal DBP. Then, the procedure proceeds to Step A4 where the scan is conducted by a light beam in the same manner as conducted above, so as to obtain a synthetic signal. After that, the procedure proceeds to Step A7 where it is judged which to select between the connection bits 1 and 0 in order to further reduce the crosstalk, and the connection bit to be inserted between the pre-format address in the target frame and the pre-format address in the next frame is determined. The judgement and determination also can be conducted by an operator.

When the logical value of the last bit of CRC of the pre-format address in the target frame is 0 (21.05 kHz) in Step A2, the procedure proceeds to Step A8. In Step A8, the connection bit 1 shown in FIG. 12A is connected for example to select the inverted bi-phase signal DBP. Then, the procedure proceeds to Step A9 where the scan is conducted by a light beam in the same manner as that described above to obtain a synthetic signal.

After that, the procedure proceeds to Step A10 where the connection bit 0 shown in FIG. 12B is connected to select the non-inverted bi-phase signal DBP. Then, the procedure proceeds to Step A11 where the scan is conducted by a light beam in the same manner as that conducted above to obtain a synthetic signal. After that, the procedure proceeds to A step A12 where it is judged which to select between the connection bits 0 and 1 in order to further reduce the crosstalk, and the connection bit to be inserted between the pre-format address in the target frame and the pre-format address in the next frame is determined. The judgement and determination are conducted in the same manner as described above.

Then, it is judged whether or not the simulation is to be finished in order to insert the connection bits in the pre-format addresses in all frames. When the connection bits for all frames are still not determined, the procedure returns to Step A2, and the Steps A2 to A7 or Steps A8 to A12 are repeated. When the connection bits for all frames are determined, the simulation processing is finished.

As described above, in the apparatus 200 for manufacturing the disc-shaped record medium according to an embodiment of the present invention, the control signal SWB for groove formation is produced by the signal generator 30 based on the result of simulation conducted by the data processor 20. Thus-produced control signal SWB is output from the signal generator 30 to the actuator 42 in the information writer 40. In the information writer 40, the optical pickup is operated to drive in the radical direction of the original disc 101 by the drive scanner 45 based on the drive control signal S3. In this state, a light beam with a predetermined intensity is caused to oscillate based on the control signal SWB for groove formation by the actuator 42 on the original disc 101 in its inner and outer peripheral direction. At the same time, grooves are formed on the original disc 101 in the state where the original disc is rotated at a predetermined linear velocity by the spindle motor 41 to define the pregrooves 1 and the lands 2 on the original disc.

As a result of these processings, the pre-format addresses can be written. The apparatus can manufacture the disc-shaped record medium 100 such as CD-R and CD-RW free from the influence of crosstalk, even if a light beam is applied across the adjacent pregrooves 1. In addition, the apparatus also can manufacture a writable disc-shaped record medium 100 having high storage density in which the pregrooves are arranged at pitches narrower than the irradiation diameter of the light beam.

(3) A Method for Manufacturing the Disc-shaped Record Medium

Figure 16:
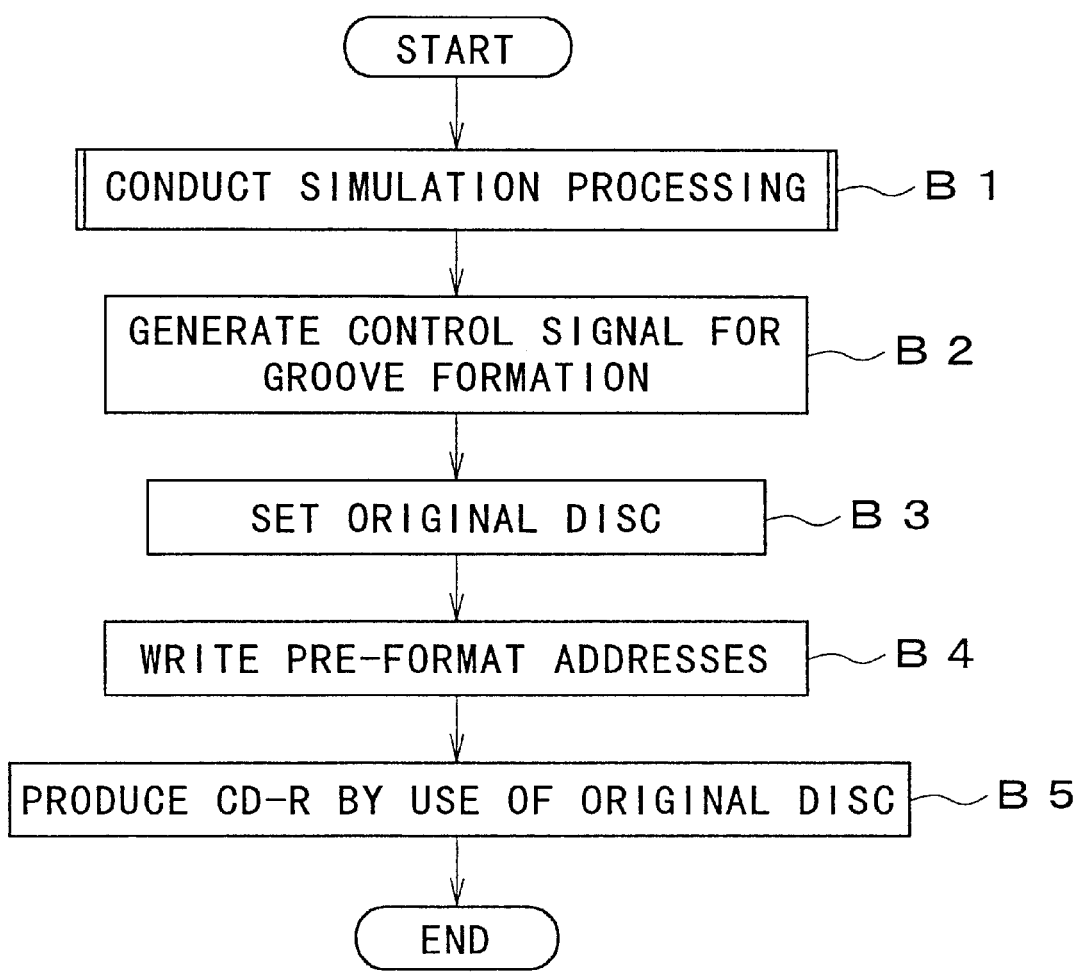
FIG. 16 is a flow chart showing an exemplary process of manufacturing a disc-shaped record medium 100 according to an embodiment of the present invention.

FIG. 16 is a flow chart showing an exemplary manufacturing of the disc-shaped record medium according to an embodiment of the present invention. FIGS. 17A to 17G are cross-sectional diagrams illustrating exemplary steps of manufacturing the disc-shaped record medium.

In this embodiment, it is assumed that a disc-shaped record medium 100 such as CD-R in which pre-format addresses are written is manufactured using an original disc 101. Based on this assumption, in Step B1 of the flow chart shown in FIG. 16, a simulation is conducted where, in order that the crosstalk caused by the coexistence of an arbitrary pre-format address with the other pre-format address adjacent to the arbitrary pre-format address in the inner and outer peripheral direction at the reading point of the arbitrary pre-format address, specific dummy information for timing adjustment is inserted beforehand between the pre-format address in the target frame and the pre-format address in the other frame next to the target frame (FIG. 15).

After that, the procedure proceeds to Step B2 where a control signal SWB for groove formation is produced based on the result of the above-described simulation. In this embodiment, the control signal SWB for groove formation is produced by the signal generator 30 in the following steps. That is, a pulse signal waveform constituting dummy information for timing adjustment is connected depending on whether the last bit of CRC of the immediately preceding pre-format address ends at a high level or a low level. As a result, a bi-phase signal DBP constituting the pre-format addresses in the next frame having synchronous information starting from high level or low level is connected to produce the control signal SWB for groove formation.

Figure 17A:
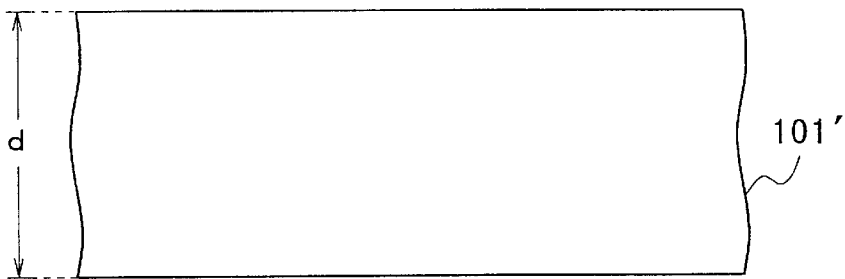
FIGS. 17A to 17G are diagrams of cross-sections showing an exemplary process of manufacturing a disc-shaped record medium 100.
Figure 17B:
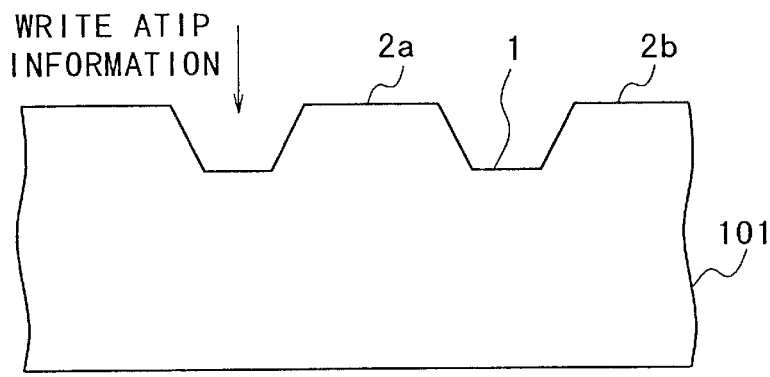
Figure 17C:
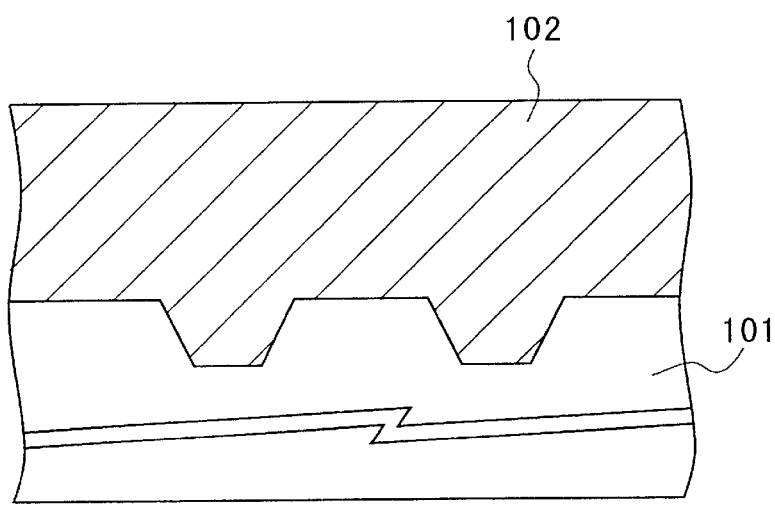
Figure 17D:
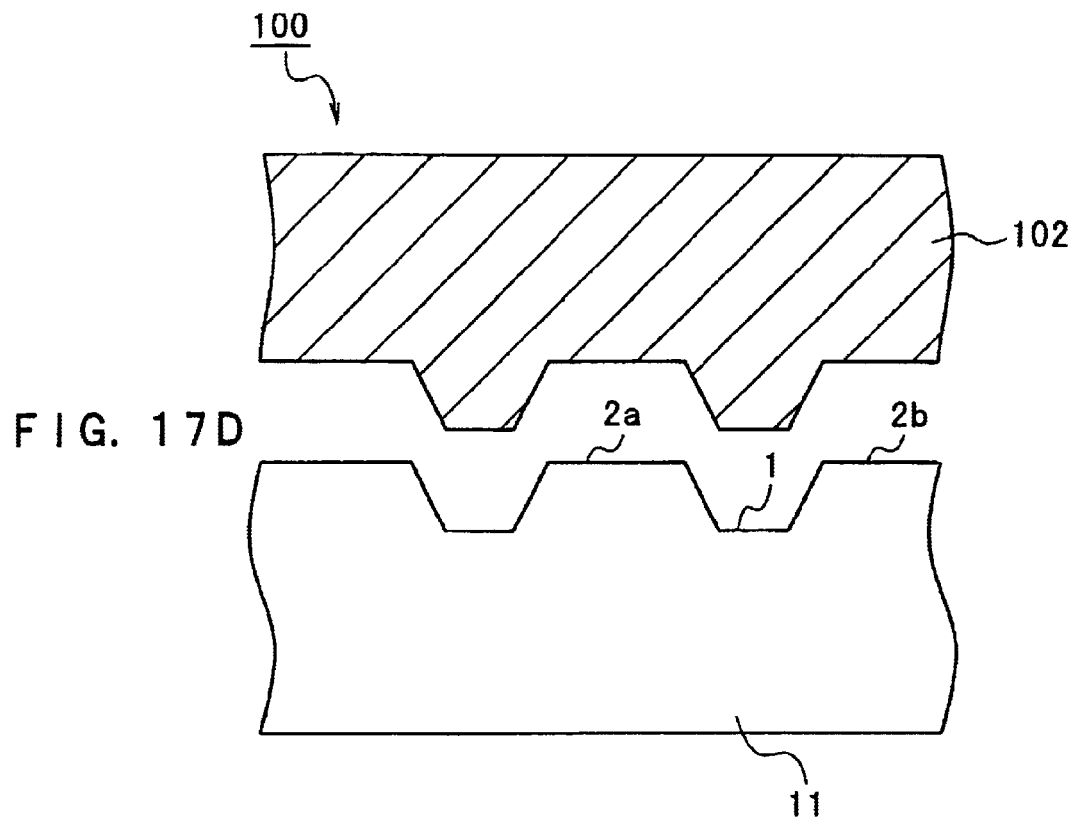

Then, the procedure proceeds to Step B3 where the original disc 101 is mounted on the apparatus 200 for manufacturing the disc-shaped record medium. The material for original disc 101' has a predetermined thickness d as shown in FIG. 17A, and is made of discoid metal plate or resin material having high hardness formed with a hole 6 for fastening the original disc as is the case of conventional CD. The original disc is mounted on the spindle motor 41 by fitting the hole 6 thereto (FIG. 5).

Then, the procedure proceeds to Step B4 where a laser beam with a predetermined intensity is caused to oscillate on the original disc 101 in its inner and outer peripheral direction. At the same time, grooves are formed on the original disc 101 in the state where the original disc is rotated at a predetermined linear velocity (about 1.2 to 1.4 m/s) to define the pregrooves 1 and the lands 2a, 2b on the original disc 101. As the laser beam, a laser beam such as argon laser (with a wavelength of 0.4579 μm) and He—Cd laser (with a wavelength of 0.4416 μm) is used. In this manner, pre-format addresses can be written on the original disc 101 shown in FIG. 17B.

In the step B5, a disc-shaped record medium 100 such as CD-R is manufactured using the original disc 101. The process of manufacturing CD-R is basically the same as the process of manufacturing conventional CD, except for forming a pigment layer 12. For example, a metal stamp 102 having ATIP information is manufactured by a known manufacturing method using the original disc 101 shown in FIG. 17C as a mold. Then, ATIP information constituted by pregrooves 1 in the shape of projections and lands 2 in the shape of pits is copied on a CD-R substrate 11 using the metal stamp 102 shown in FIG. 17D. As the CD-R substrate 11, a discoid substrate 11 made of a material such as polycarbonate and ultraviolet cured resin that is used for conventional CD is used. The CD-R substrate 11 has a diameter of about 12 cm or 8 cm. When formed with a diameter of about 12 cm, the CD-R substrate 11 has a storage capacity of 550 MB to 650 MB (for 63 to 74 minutes). When formed with a diameter of about 8 cm, the CD-R substrate 11 has a storage capacity of 190MB (for 21 minutes).

Figure 17E:
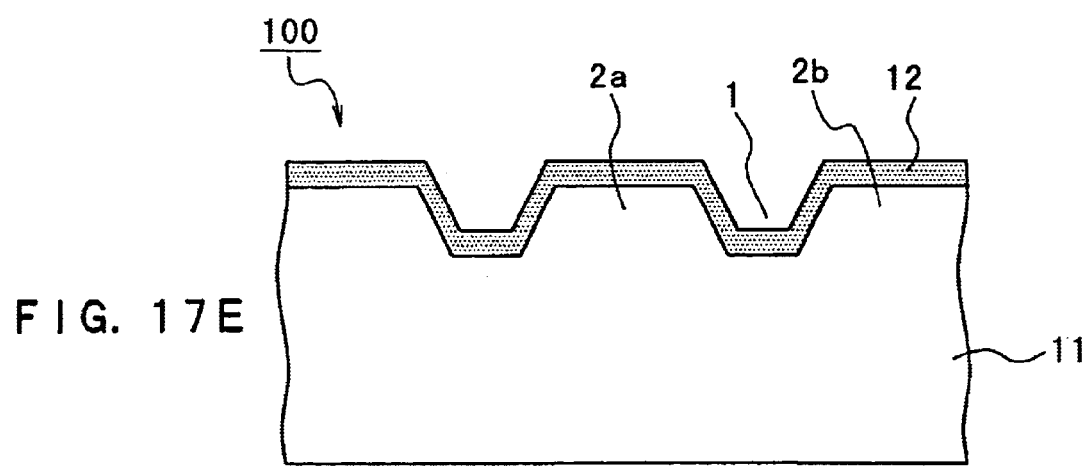
Figure 17F:
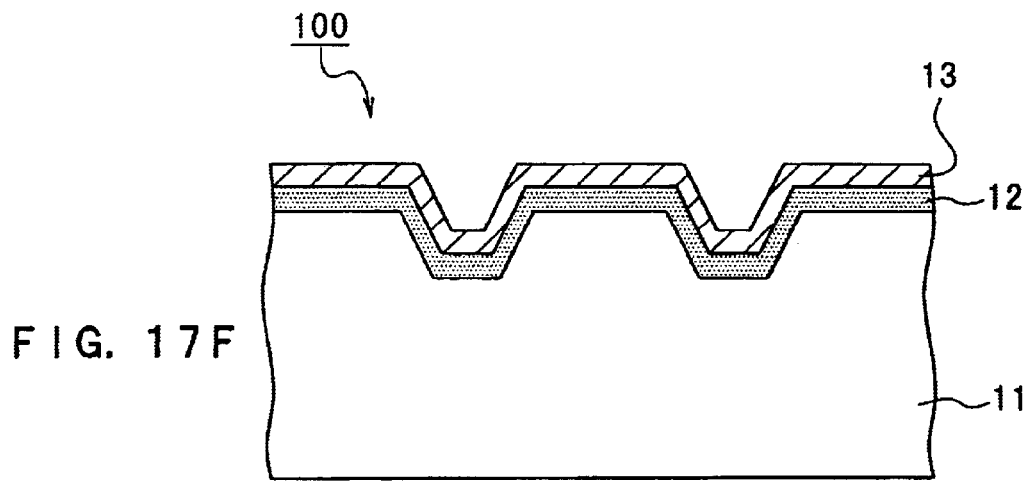
Figure 17G:
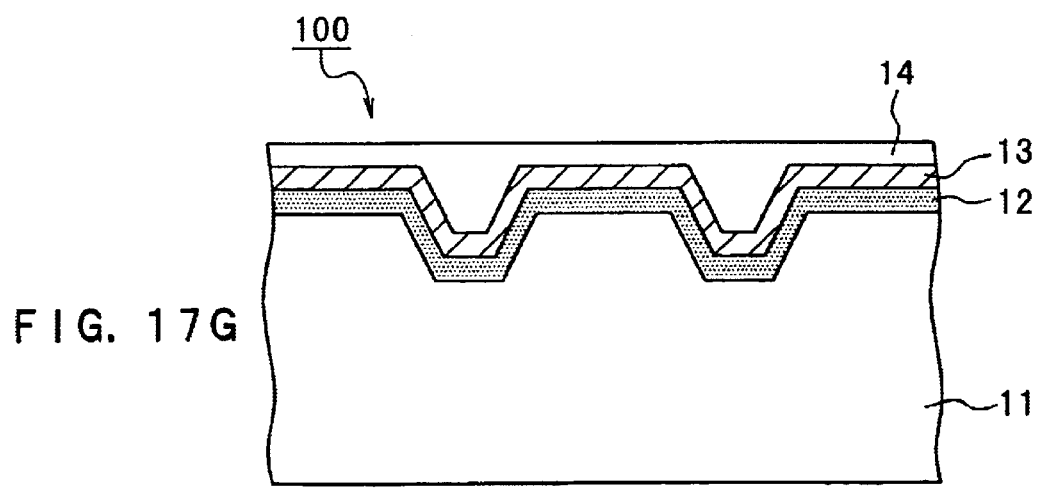

After that, the CD-R substrate 11 having ATIP information shown in FIG. 17E is spin-coated with a pigment to form at least a pigment layer 12 on the pregroove 1 (in the guide groove). For example, green-colored pigment is dissolved in a solvent, and the solvent is dropped on the CD-R substrate 11 while the CD-R substrate 11 is rotated at high velocity to create a centrifugal force. The solvent of the pigment member is spread over the CD-R substrate 11 by the centrifugal force to form the pigment layer 12 having a uniform thickness (about 100 nm). As the pigment member, a pigment such as cyanin pigments, phthalocyanin pigments is used. The pigment layer 12 made of these pigments is suitable for recording small pits, and has high resistance to light. The pigment layer 12 is used as a recording layer. On the pigment layer 12 shown in FIG. 17F, a reflective member such as gold and silver is sputtered to form a reflection layer 13. On the reflection layer 13 shown in FIG. 17G, a transparent UV (ultraviolet) protective member is applied to form a protective layer 14. On the upper portion of the protective layer, a label is printed. As a result, a disc-shaped record medium 100 such as CD-R is obtained. The disc-shaped record medium is a blank disc in which no information is recorded in its record layer at the time when it is delivered from the factory.

As described above, in the method for manufacturing the disc-shaped record medium according to an embodiment of the present invention, at the time of manufacturing a disc such as CD-R in which pre-format addresses are written, a simulation is conducted where, in order that the crosstalk caused by the coexistence of an arbitrary pre-format address with the other pre-format address adjacent to the arbitrary pre-format address in the inner and outer peripheral direction at the reading point of the arbitrary pre-format address, specific dummy information for timing adjustment is inserted beforehand between the pre-format address in the target frame and the pre-format address in the other frame next to the target frame.

In this manner, a control signal SWB for groove formation intended for the case where an arbitrary pre-format address is designated and information is written in the pregroove 1, and the information is read from the address is produced. The control signal SWB for groove formation is capable of removing the influence of crosstalk generated at the time when a light beam is applied across the adjacent pregrooves 1. By writing the pre-format addresses based on the control signal SWB, it is possible to manufacture a writable CD-R having high storage density in which the pregrooves 1 are arranged at pitches narrower than the irradiation diameter of the light beam. The pre-format addresses of the disc-shaped record medium 100 can be read using a conventional recording and reproducing apparatus.

As described above, according to the disc-shaped record medium of the present invention, a simulation is conducted where, in order that the crosstalk caused by the coexistence of an arbitrary pre-format address with the other pre-format address adjacent to the arbitrary pre-format address in the inner and outer peripheral direction at the reading point of the arbitrary pre-format address, specific dummy information for timing adjustment is inserted beforehand between the pre-format address in the target frame and the pre-format address in the other frame next to the target frame. Based on the result of the simulation, a control signal for groove formation is produced. Based on the control signal, a light beam with a predetermined intensity is caused to oscillate on the original disc in its inner and outer peripheral direction. At the same time, the original disc is rotated at a predetermined linear velocity. In this manner, the pregrooves and the lands are defined on the original disc. As a result of these processes, pre-format addresses are written in the grooves for guiding light beam.

In this structure, the influence of crosstalk generated at the time when a light beam is applied across the adjacent pregrooves can be prevented even if a light beam is applied across the adjacent pregrooves when an arbitrary pre-format address is designated to write information in the pregroove, or the information is read from the pre-format address. With this arrangement, it becomes possible to provide a writable optical disc having high storage density in which the pregrooves are arranged at pitches narrower than the irradiation diameter of the light beam.

In the method for manufacturing the disc-shaped record medium according to the present invention, a simulation is conducted where specific dummy information for timing adjustment is inserted beforehand between a pre-format address in a target frame and a pre-format address in the other frame next to the target frame in such a manner that the above-described crosstalk is suppressed.

In this structure, a control signal for groove formation intended for the case where an arbitrary pre-format address is designated and information is written in the pregroove 1, and the information is read from the address can be produced. The control signal for groove formation is capable of removing the influence of crosstalk generated at the time when a light beam is applied across the adjacent pregrooves. By writing the pre-format addresses based on the control signal SWB, it is possible to manufacture a writable CD-R having high storage density in which the pregrooves are arranged at pitches narrower than the irradiation diameter of the light beam.

In the apparatus for manufacturing the disc-shaped record medium according to the present invention, an information writer for writing pre-format addresses is provided. In order to reduce crosstalk between adjacent pregrooves such as described above, a simulation is conducted where specific dummy information for timing adjustment is inserted beforehand between a pre-format address in a target frame and a pre-format address in the other frame next to the target frame. Based on the control signal, a light beam with a predetermined intensity is caused to oscillate on the original disc in its inner and outer peripheral direction. At the same time, grooves are formed on the original disc in the state where the original disc is rotated at a predetermined linear velocity to define the pregrooves and the lands on the original disc.

In this structure, it is possible to manufacture a disc-shaped record medium free from the influence of crosstalk even if a light beam is applied across the adjacent pregrooves. In addition, it is possible to manufacture a writable optical disc having high storage density in which the pregrooves 1 are arranged at pitches narrower than the irradiation diameter of the light beam with excellent reproducibility.

The present invention is extremely preferable when applied to a writable optical disc such as a write once optical disc (CD-R), a rewritable optical disc (CD-RW), and a mini disc (MD).

What is claimed is:

1. A disc-shaped record medium in which pre-format addresses are written along its pre-format wobble grooves for guiding a light beam, comprising:
    a first pre-format address located in a first region of the pre-format wobble grooves;
    a second pre-format address located in a second region of the pre-format wobble grooves, the second region being adjacent to the first region along a radial path of the light beam; and
    specific dummy information pre-recorded between the first and second pre-format addresses for offsetting timing between the second pre-format address and a reading point of the first pre-format address to reduce crosstalk therebetween.

2. A disc-shaped record medium according to claim 1, manufactured by use of an original disc in which the pre-format addresses are written by causing a light beam with a predetermined intensity to oscillate on the original disc in its inner and outer peripheral direction while the original disc is rotated at a predetermined linear velocity by the control signal for groove formation produced based on a result of a simulation to define pregrooves in the shape of pits and the lands in the shape of projections on the original disc.

3. A method for manufacturing a disc-shaped record medium in which pre-format addresses are written in its grooves for guiding a light beam, comprising the steps of:
    inserting specific dummy information for timing adjustment beforehand between a pre-format address in a target frame and an other pre-format address in an other frame next to the target frame to reduce crosstalk caused by a coexistence of the pre-format address in the target frame with the other pre-format address in an other frame next to the target frame in an inner and outer peripheral direction at a reading point of the pre-format address of the target frame;
    producing a control signal for groove formation based on the result of the simulation; and
    causing a light beam with a predetermined intensity to oscillate on the disc in its inner and outer peripheral direction while the disc is rotated at a predetermined linear velocity to define pregrooves in a shape of pits and lands in a shape of projections on the disc, thereby writing the pre-format addresses in the disc.

4. The method according to claim 3, wherein the pre-format addresses include at least error correction information, and
    wherein the pre-format addresses are formed in a bi-phase modulation mode where, depending on whether a waveform of a last pulse signal constituting the error correction information of an immediately preceding pre-format address ends at a high level or low level, a waveform of a pulse signal constituting a pre-format address in a next frame is connected without being inverted, or the waveform of the pulse signal is inverted and connected.

5. The method according to claim 3, wherein in the step of producing the control signal for groove formation, when a waveform of a last pulse signal constituting the error correction information of an immediately preceding pre-format address ends at high level, subsequent to a waveform of a pulse signal constituting dummy information for timing adjustment, a waveform of a pulse signal constituting a pre-format address in a next frame including synthetic information starting at high level or low level is connected.

6. The method according to claim 3, wherein in the step of producing the control signal for groove formation, when a waveform of a last pulse signal constituting the error correction information of an immediately preceding pre-format address ends at low level, a waveform of a pulse signal constituting dummy information for timing adjustment is connected, and then a waveform of a pulse signal constituting a pre-format address in a next frame including synthetic information starting at high level or low level is connected.

7. The method according to claim 3, wherein the control signal for groove formation is constituted by a sine wave signal produced by, after conducting a baseband modulation for the pre-format addresses in the bi-phase modulation mode, frequency-modulating a carrier signal at a frequency of 22.05 kHz with a frequency of ±1 kHz based on a pulse signal obtained as a result of the baseband modulation.

8. An apparatus for manufacturing a disc-shaped record medium in which pre-format addresses are written along its grooves for guiding a light beam, comprising:
    a data processor configured to insert specific dummy information for timing adjustment beforehand between a pre-format address in a target frame and an other pre-format address in an other frame next to the target frame to reduce crosstalk caused by a coexistence of the pre-format address in the target frame with the other pre-format address in an other frame next to the target frame in an inner and outer peripheral direction at a reading point of the pre-format address of the target frame;
    a signal generator configured to produce a control signal for groove formation based on the result of the simulation by the data processor; and
    an information writer configured to cause a light beam with a predetermined intensity to oscillate on the disc in its inner and outer peripheral direction while the disc is rotated at a predetermined linear velocity to define pregrooves in a shape of pits and lands in a shape of projections on the disc, thereby writing the pre-format addresses in the disc.

9. The apparatus according to claim 8, wherein the pre-format addresses include at least error correction information, and
    wherein the data processor conducts a simulation in a bi-phase modulation mode where, depending on whether a waveform of a last pulse signal constituting the error correction information of an immediately preceding pre-format address ends at a high level or low level, a waveform of a pulse signal constituting a pre-format address in a next frame is connected without being inverted, or the waveform of the pulse signal is inverted and connected.

10. The apparatus according to claim 8, wherein the control signal for groove formation is produced in such a manner that, when a waveform of a last pulse signal constituting the error correction information of an immediately preceding pre-format address ends at high level, next to a waveform of a pulse signal constituting dummy information for timing adjustment, a waveform of a pulse signal constituting a pre-format address in a next frame including synthetic information starting at high level or low level is connected.

11. The apparatus according to claim 8, wherein the signal generator produces the control signal for groove formation in such a manner that, when a waveform of a last pulse signal constituting the error correction information of an immediately preceding pre-format address ends at low level, subsequent to a waveform of a pulse signal constituting dummy information for timing adjustment, a waveform of a pulse signal constituting a pre-format address in a next frame including synthetic information starting at high level or low level is connected.

12. The apparatus according to claim 8, wherein the control signal for groove formation is constituted by a sine wave signal produced by, after conducting a baseband modulation for the pre-format addresses in the bi-phase modulation mode, frequency-modulating a carrier signal at a frequency of 22.05 kHz with a frequency of ±1 kHz based on a pulse signal obtained as a result of the baseband modulation.

13. An apparatus for manufacturing a disc-shaped record medium in which pre-format addresses are written along its grooves for guiding a light beam, comprising:

processing means for inserting specific dummy information to provide timing adjustment beforehand between a pre-format address in a target frame and an other pre-format address in an other frame next to the target frame to reduce crosstalk caused by a coexistence of the pre-format address in the target frame with the other pre-format address in an other frame next to the target frame in an inner and outer peripheral direction at a reading point of the pre-format address of the target frame;

signal generation means for producing a control signal for groove formation based on the result of the simulation by the data processor; and information writing means for causing a light beam with a predetermined intensity to oscillate on the disc in its inner and outer peripheral direction while the disc is rotated at a predetermined linear velocity to define pregrooves in a shape of pits and lands in a shape of projections on the disc, thereby writing the pre-format addresses in the disc.

* * * * *